(12) United States Patent
Takata et al.

(10) Patent No.: US 12,509,656 B2
(45) Date of Patent: Dec. 30, 2025

(54) MICROORGANISM CULTURE APPARATUS AND MICROORGANISM CULTURE METHOD

(71) Applicant: Murata Manufacturing Co., Ltd., Nagaokakyo (JP)

(72) Inventors: Masachika Takata, Nagaokakyo (JP); Hirofumi Sunahara, Nagaokakyo (JP); Yoshiteru Aoi, Higashihiroshima (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 1021 days.

(21) Appl. No.: 17/481,738

(22) Filed: Sep. 22, 2021

(65) Prior Publication Data

US 2022/0002650 A1  Jan. 6, 2022

Related U.S. Application Data

(63) Continuation of application No. PCT/JP2020/009163, filed on Mar. 4, 2020.

(30) Foreign Application Priority Data

Mar. 26, 2019 (JP) .................................. 2019-057726

(51) Int. Cl.
*C12M 3/00* (2006.01)
*C12M 1/00* (2006.01)
(Continued)

(52) U.S. Cl.
CPC ............ *C12M 23/44* (2013.01); *C12M 23/20* (2013.01); *C12M 23/34* (2013.01); *C12M 23/48* (2013.01);
(Continued)

(58) Field of Classification Search
None
See application file for complete search history.

(56) References Cited

U.S. PATENT DOCUMENTS

| 7,011,957 B2 | 3/2006 | Lewis et al. |
| 2014/0274739 A1 | 9/2014 | Rinker et al. |

(Continued)

FOREIGN PATENT DOCUMENTS

| DE | 102012202570 A1 | 8/2013 |
| EP | 0363262 A1 | 4/1990 |

(Continued)

OTHER PUBLICATIONS

Nichols, D. et al.; "Use of Ichip for High-Throughput In Situ Cultivation of "Uncultivable" Microbial Species"; Applied and Environmental Microbiology, Feb. 19, 2010, vol. 76, No. 8, pp. 2445-2450, abstract, pp. 2445, 2446.

(Continued)

*Primary Examiner* — Jyoti Nagpaul
(74) *Attorney, Agent, or Firm* — ArentFox Schiff LLP

(57) ABSTRACT

A microorganism culture apparatus includes a three-layer stacked structure having a layered culture unit (1) that cultures a microorganism, a layered nutrient supply unit (2) that is arranged on a first surface (11) of the culture unit (1) and supplies a nutrient to the culture unit (1), and a layered environmental component supply unit (3) that is arranged on a second surface (12) and supplies an environmental component to the culture unit (1).

22 Claims, 18 Drawing Sheets

(51) Int. Cl.
  *C12M 1/34* (2006.01)
  *C12M 1/42* (2006.01)
(52) U.S. Cl.
  CPC ............ *C12M 35/00* (2013.01); *C12M 41/12* (2013.01); *C12M 41/26* (2013.01); *C12M 41/34* (2013.01)

(56) References Cited

U.S. PATENT DOCUMENTS

2016/0304823 A1  10/2016 Hirano et al.
2017/0064912 A1* 3/2017 Tabakman ............. A01G 31/06

FOREIGN PATENT DOCUMENTS

| EP | 2955220 A1 | 12/2015 |
| JP | H0292270 A | 4/1990 |
| JP | 2009273399 A | 11/2009 |
| JP | 2010161979 A | 7/2010 |
| JP | 2012175973 A | 9/2012 |
| JP | 2016086654 A | 5/2016 |
| JP | 2016202180 A | 12/2016 |

OTHER PUBLICATIONS

International Search Report issued in PCT/JP2020/009163, dated Jun. 2, 2020.
Written Opinion of the International Search Report issued in PCT/JP2020/009163, dated Jun. 2, 2020.

* cited by examiner

MICROORGANISM CULTURE APPARATUS AND MICROORGANISM CULTURE METHOD

CROSS-REFERENCE TO RELATED APPLICATIONS

The present application is a continuation of International Application No. PCT/JP2020/009163, filed Mar. 4, 2020, which claims priority to Japanese Patent Application No. 2019-057726, filed Mar. 26, 2019, the entire contents of each of which being incorporated herein by reference.

FIELD OF THE INVENTION

The present invention relates to microorganism culture devices and related methods capable of achieving various culture conditions, allowing for the study of various difficult-to-culture microorganisms.

BACKGROUND OF THE INVENTION

A microorganism of interest is typically isolated from a pure culture of the microorganism. Traditionally, this pure culture is generated using an agar plate surface smearing method. In this method, microorganisms collected from the environment are smeared on a solid medium prepared in a petri dish and cultured. However, this method is non-ideal because many microorganisms do not grow under these conditions. Indeed, it is thought that only about 1% of microorganisms in the environment can be cultured by a conventionally performed agar-plate surface smear method. Such methods are limited due to several constraints. First, due to the closed culture environment, it is not possible to easily remove substances generated by the cultured microorganism. As a result, metabolites of the microorganism and environmental components accumulate in the culture and inhibit the growth and multiplication of the microorganism. Furthermore, it is difficult to maintain in a solid medium the concentration of a nutrient required for the growth of a target microorganism.

Prior researchers have attempted to addresses these concerns by performing the culturing while a liquid medium is continuously supplied, or by culturing microorganisms on a solid medium placed in a natural environment. Examples of such methods are described in Japanese Patent Application Pub. No. 2016-86654 and in U.S. Pat. No. 7,011,957, the entire contents of each of which being incorporated herein by reference. However, these methods are fail to provide an effective solution (e.g., due to the instability associated with attempts to culture microorganisms in a natural environment and limitations on the parameters that can be modified).

SUMMARY OF THE INVENTION

In some aspects, the present disclosure provides a microorganism culture kit that can be used to provide various culture conditions. These devices implement a simple design that can be rapidly configured, allowing researchers to study otherwise difficult to culture microorganisms. In a first general aspect, such devices comprise a three-layer stacked structure that includes: a layered culture unit that cultures a microorganism; and at least one of a layered nutrient supply unit that supplies a nutrient to the culture unit and a layered environmental component supply unit that supplies an environmental component to the culture unit, the layered nutrient supply unit and the layered environmental component supply unit being arranged on a first surface and a second surface opposite to the first surface of the culture unit.

In a second general aspect, the disclosure provides methods for culturing microorganisms using a microorganism culture apparatus in which the nutrient supply unit is configured to allow a nutrient-containing gas or a nutrient-containing liquid to flow therethrough, or the environmental component supply unit is configured to allow an environmental component-containing gas or an environmental component-containing liquid to flow therethrough, and the method includes at least one of a nutrient changing step of changing at least one of a type and a concentration of a nutrient-containing gas or a nutrient-containing liquid allowed to flow through the nutrient supply unit, and an environmental component changing step of changing at least one of a type and a concentration of an environmental component-containing gas or an environmental component-containing liquid allowed to flow through the environmental component supply unit.

In a third general aspect, the disclosure provides methods for culturing microorganisms using a microorganism culture apparatus in which the nutrient supply unit is provided so as to be exchangeable with another nutrient supply unit or exchangeable with an environmental component supply unit, or the environmental component supply unit is provided so as to be exchangeable with another environmental component supply unit or exchangeable with a nutrient supply unit, and the method includes at least one of a nutrient exchange step of exchanging the nutrient supply unit with another nutrient supply unit or with an environmental component supply unit, and an environmental component exchange step of exchanging the environmental component supply unit with another environmental component supply unit or with a nutrient supply unit.

In a fourth general aspect, the disclosure provides methods for culturing microorganisms using a microorganism culture apparatus in which the nutrient supply unit is configured to allow to flow a nutrient-containing gas or a nutrient-containing liquid therethrough, or the environmental component supply unit is configured to allow to flow an environmental component-containing gas or an environmental component-containing liquid therethrough, and further the culture unit includes one or more types of sensors for detecting a culture state, and the method includes a monitoring step of detecting and monitoring a culture state of the culture unit by a sensor, and further includes at least one of a nutrient changing step of changing at least one of a type and a concentration of a nutrient-containing gas or a nutrient-containing liquid allowed to flow through the nutrient supply unit, and an environmental component changing step of changing at least one of a type and a concentration of an environmental component-containing gas or an environmental component-containing liquid allowed to flow through the environmental component supply unit, based on a monitoring result.

In a fifth general aspect, the disclosure provides methods for culturing microorganisms using a microorganism culture apparatus in which the nutrient supply unit is provided so as to be exchangeable with another nutrient supply unit or exchangeable with an environmental component supply unit, or the environmental component supply unit is provided so as to be exchangeable with another environmental component supply unit or exchangeable with a nutrient supply unit, and further the culture unit includes one or more types sensors for detecting a culture state, and the method includes a monitoring step of detecting and monitoring a culture state of the culture unit by a sensor, and further includes at least one of a nutrient exchange step of exchanging the nutrient supply unit with another nutrient supply unit or an environmental component supply unit and an environmental component exchange step of exchanging the environmental component supply unit with another environmental component supply unit or a nutrient supply unit, based on a monitoring result.

According to the microorganism culture apparatus of the first aspect of the present invention, since nutrients can be supplied from the nutrient supply unit and/or environmental components can be supplied from the environmental component supply unit to the culture unit, microorganisms can be cultured in the culture unit. In addition, since the apparatus can be configured by the three-layer stacked structure, the apparatus configuration can be simplified. Therefore, since a culture operation can be easily performed, various culture conditions can be achieved and various difficult-to-culture microorganisms can be obtained.

According to the microorganism culture methods of the second and third aspects of the present invention, since the culture conditions for the culture unit can be easily changed, it is possible to achieve various culture conditions and obtain various difficult-to-culture microorganisms.

According to the microorganism culture methods of the fourth and fifth aspects of the present invention, since the culture condition for the culture unit can be easily changed based on the monitoring result even in the middle of the culture, an optimum culture condition can be easily achieved, and various difficult-to-culture microorganisms can be obtained.

DETAILED DESCRIPTION

Aspects of the present disclosure will be more specifically described below, with reference to the drawings where appropriate. However, it should be understood that while exemplary devices and methods are described, the present disclosure is not necessarily limited to those devices and methods alone.

Figure 1:
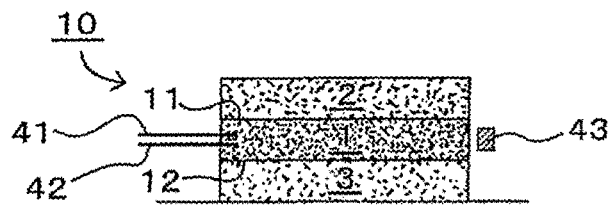
FIG. 1 is a schematic cross-sectional view illustrating a first example of a basic form of a three-layer stacked structure included in a microorganism culture apparatus of the present invention.
Figure 2:
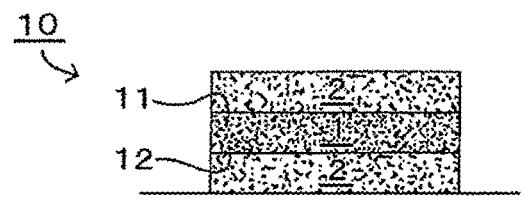
FIG. 2 is a schematic cross-sectional view illustrating a second example of the basic form of the three-layer stacked structure included in the microorganism culture apparatus of the present invention.
Figure 3:
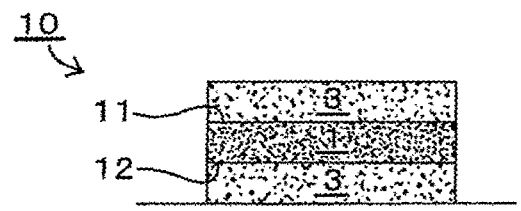
FIG. 3 is a schematic cross-sectional view illustrating a third example of the basic form of the three-layer stacked structure included in the microorganism culture apparatus of the present invention.

First, a basic form of a microorganism culture apparatus and a microorganism culture method of the present invention will be described. In some aspects, the microorganism culture apparatus of the present invention includes a three-layer stacked structure. As illustrated in FIG. 1 to FIG. 3, the three-layer stacked structure may comprise the following three types of configurations.

A three-layer stacked structure 10 illustrated in FIG. 1 includes a layered culture unit 1, a layered nutrient supply unit 2 arranged on a first surface 11 of the culture unit 1, and a layered environmental component supply unit 3 arranged on a second surface 12 of the culture unit 1.

The three-layer stacked structure 10 illustrated in FIG. 2 has the layered culture unit 1 and the layered nutrient supply unit 2 arranged on the first surface 11 and the second surface 12 of the culture unit 1. In this configuration, the layered nutrient supply unit 2 arranged on the first surface 11 and the nutrient supply unit 2 arranged on the second surface 12 may differ from each other in at least one of the type and the concentration of the nutrient to be supplied.

The three-layer stacked structure 10 illustrated in FIG. 3 has the layered culture unit 1 and the layered environmental component supply unit 3 arranged on the first surface 11 and the second surface 12 of the culture unit 1. In this configuration, the environmental component supply unit 3 arranged on the first surface and the environmental component supply unit 3 arranged on the second surface may differ from each other in at least one of the type and the concentration of the environmental component to be supplied.

Figure 4:
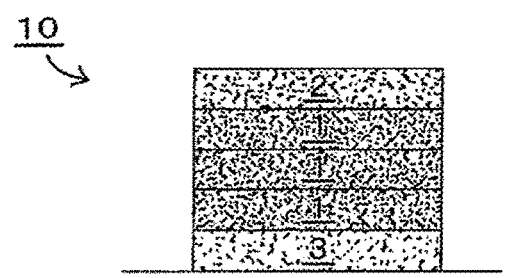
FIG. 4 is a schematic cross-sectional view illustrating a modified example of the three-layer stacked structure.
Figure 5:
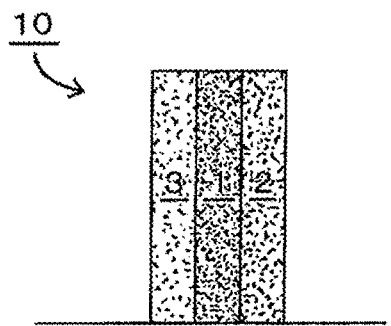
FIG. 5 is a schematic cross-sectional view illustrating another modified example of the three-layer stacked structure.

In some aspects, it is preferable that the three-layer stacked structure 10 includes a membrane filter between the layers. In addition, the three-layer stacked structure 10 may also include, for example, a configuration in which two or more layers of the culture units 1 are stacked as illustrated in FIG. 4. This is because the culture units 1, in which two or more layers are stacked, can be regarded as an integrated culture unit. Further, the three-layer stacked structure 10 may also include a laterally stacked configuration as illustrated in FIG. 5. In the three-layer stacked structure, the culture unit may be provided so as to be exchangeable with another culture unit. The other culture unit may be a culture unit different from the original culture unit in at least one of the type of microorganism and the type or the concentration of the culture medium.

The culture unit is configured to culture microorganisms and has a culture medium in which microorganisms are seeded, that is, a microorganism-containing culture medium. As the culture medium, for example, agar or the like can be used. In some aspects, the culture unit includes one or more types of sensors for detecting the culture state. The sensor may be selected from a temperature sensor, a pH sensor, and a gas concentration sensor. Further, it in some aspects, one or more types of stimulation applying units that apply physical stimulation to the culture unit from the outside may be attached to the culture unit. The stimulation applying unit may be selected from a light irradiation unit, a heating unit, an electromagnetic wave irradiation unit, and an ultrasonic vibration unit. For example, as illustrated in FIG. 1, a temperature sensor 41, a pH sensor 42, and an ultrasonic oscillator (ultrasonic vibration unit) 43 are provided for the culture unit 1.

The nutrient supply unit is configured to supply a nutrient to the culture unit. Nutrients are substrates (growth factors) such as nutrients necessary for the growth of microorganisms. The nutrients may be supplied in a solid or liquid or gaseous state, i.e. as a nutrient-containing material or nutrient-containing liquid or nutrient-containing gas. When the nutrient-containing liquid or the nutrient-containing gas is supplied, the nutrient supply unit preferably has an inflow path and an outflow path for allowing the nutrient-containing liquid or the nutrient-containing gas to flow therethrough. In this case, it is preferable that the inflow path and the outflow path be provided so as to be openable and closable. As an opening/closing means thereof, a mechanism having a plug, which can be detachably attached, for closing the inflow path and the outflow path can be adopted. In this case, the nutrient-containing material can be used by closing the inflow path and the outflow path.

In the three-layer stacked structure, the nutrient supply unit may be provided so as to be exchangeable with another nutrient supply unit or exchangeable with the environmental component supply unit. The other nutrient supply unit is a nutrient supply unit different from the original nutrient supply unit in at least one of the type and the concentration of the nutrient.

The environmental component supply unit may be configured to supply an environmental component to the culture unit. As used herein, the term "environmental component" refers to an environmental factor that allows microorganisms to grow in a state close to the natural environment. The environmental component is supplied in a solid or liquid or gaseous state, i.e. as an environmental component-containing material or environmental component-containing liquid or environmental component-containing gas. As the environmental component-containing material, for example, soil can be used as it is. As the environmental component-containing liquid, for example, seawater can be used as it is.

When the environmental component-containing liquid or the environmental component-containing gas is supplied, the environmental component supply unit may have an inflow path and an outflow path for allowing the environmental component-containing liquid or the environmental component-containing gas to flow therethrough. In this case, the inflow path and the outflow path may be provided so as to be openable and closable. As an opening/closing means thereof, a mechanism having a plug, which can be detachably attached, for closing the inflow path and the outflow path can be adopted. In this case, the environmental component-containing material can be used by closing the inflow path and the outflow path.

In the three-layer stacked structure, the environmental component supply unit may be provided so as to be exchangeable with another environmental component supply unit or exchangeable with a nutrient supply unit. The other environmental component supply unit may be an environmental component supply unit different from the original environmental component supply unit in at least one of the type and the concentration of the environmental factor.

The microorganism culture devices described herein provide various advantages compared to prior devices. Since nutrients can be supplied from the nutrient supply unit 2 and/or environmental components can be supplied from the environmental component supply unit 3 to the culture unit 1, microorganisms can be cultured in the culture unit 1. Since the apparatus can be configured by the three-layer stacked structure 10, the apparatus configuration can be simplified. Since the microorganism can be cultured in the culture unit 1 only by holding the microorganism-containing culture medium in the culture unit 1, holding the nutrient-containing material in the nutrient supply unit 2 or allowing the nutrient-containing liquid or nutrient-containing gas to flow through the nutrient supply unit 2, and/or holding the environmental component-containing material in the environmental component supply unit 3 or allowing the environmental component-containing liquid or environmental component-containing gas to flow through the environmental component supply unit 3, the culture operation is easy.

In aspects where the three-layer stacked structure 10 of FIG. 2 is implemented, when at least one of the type and the concentration of the nutrient to be supplied differs between the nutrient supply unit 2 on the first surface 11 side and the nutrient supply unit 2 on the second surface 12 side, different nutrient conditions can be applied to the culture unit 1 from both surfaces. Therefore, two kinds of culture conditions can be set at one time.

In aspects where the three-layer stacked structure 10 of FIG. 3 is implemented, when at least one of the type and the concentration of the environmental component to be supplied differs between the environmental component supply unit 3 on the first surface 11 side and the environmental component supply unit 3 on the second surface 12 side, different environmental component conditions can be applied to the culture unit 1 from both surfaces. Therefore, two kinds of culture conditions can be set at one time.

By providing a membrane filter between the layers, contamination of microorganisms between the layers can be prevented. By exchanging the culture unit 1 with another culture unit, it is possible to easily select a microorganism-containing culture medium suitable for the already set culture conditions.

In aspects where the nutrient supply unit 2 allows the nutrient-containing liquid or nutrient-containing gas to flow therethrough, at least one of the type and the concentration of the nutrient to be supplied can be changed on the way. Therefore, the culture conditions for the culture unit 1 can be easily changed during the culture operation, and various culture conditions can be achieved.

In aspects where the environmental component supply unit 3 allows the environmental component-containing liquid or the environmental component-containing gas to flow therethrough, at least one of the type and the concentration of the environmental component to be supplied can be changed on the way. Therefore, the culture conditions for the culture unit 1 can be easily changed during the operation, and various culture conditions can be achieved.

By exchanging the nutrient supply unit 2 with another nutrient supply unit or with the environmental component supply unit, the culture conditions for the culture unit 1 can be easily changed, and various culture conditions can be achieved. By exchanging the environmental component supply unit 3 with another environmental component supply unit or with the nutrient supply unit, the culture conditions for the culture unit 1 can be easily changed, and various culture conditions can be achieved.

The culture state of the culture unit 1 can be detected by a sensor. Therefore, the suitability of the culture conditions can be easily determined. By monitoring the detection result by the sensor, as described above, the culture conditions for the culture unit 1 can be easily changed based on the monitoring result. Therefore, even in the middle of the culture operation, the optimum culture condition can be easily achieved, and various difficult-to-culture microorganisms can be obtained. In some aspects, physical stimulation may be applied to the culture unit 1 from the outside by the stimulation applying unit, encouraging or triggering growth and/or division of the microorganism being cultured.

Four exemplary microorganism culture devices according to the disclosure shall now be described in detail. These embodiments are non-limiting and provided solely for context.

Three-Layer Integrated Apparatus

Figure 6:
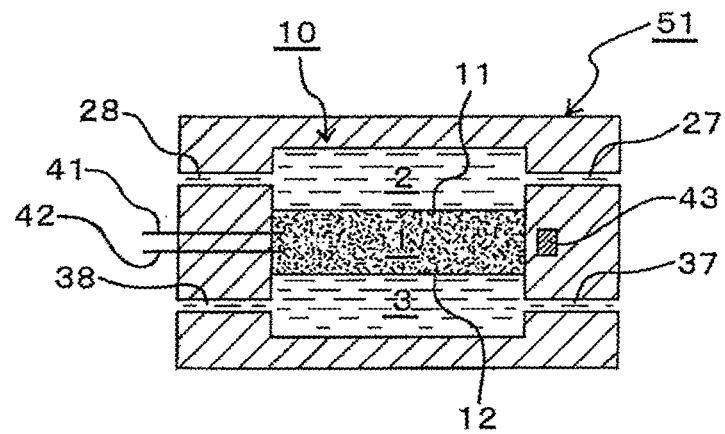
FIG. 6 is a schematic cross-sectional view illustrating a first example of a basic form of the microorganism culture apparatus of the present invention.

As illustrated in FIG. 6, which is a schematic cross-sectional view, the three-layer integrated apparatus has a configuration in which the three-layer stacked structure 10 is accommodated in one case 51. This makes it possible to achieve a very compact apparatus. Note that, the three-layer stacked structure 10 may have a circular shape, a triangular shape, a quadrangular shape, or any other polygonal shape in a plan view.

The nutrient supply unit 2 may have an inflow path 27 and an outflow path 28 that can be opened and closed. In addition, the environmental component supply unit 3 may have an inflow path 37 and an outflow path 38 that can be opened and closed.

The culture unit 1 may include a temperature sensor 41, the pH sensor 42, and the ultrasonic oscillator 43. Both the sensors 41 and 42 are provided so as to detect the culture state of microorganisms in the culture unit 1. The detection results by both the sensors 41 and 42 can be preferably monitored by an external device (not illustrated). The ultrasonic oscillator 43 is provided so as to apply ultrasonic vibration to the microorganism-containing culture medium held in the culture unit 1. The operation of the ultrasonic oscillator 43 is preferably controlled by the external device.

Note that, the three-layer stacked structure 10 of FIG. 6 has the configuration of FIG. 1, but in alternative aspects it may have the configurations of FIG. 2 to FIG. 5 and the like.

Jacket-Type Apparatus

Figure 7:
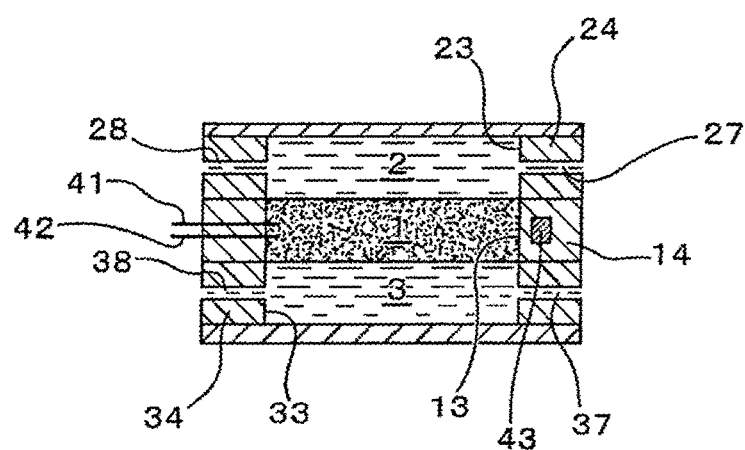
FIG. 7 is a schematic cross-sectional view illustrating a second example of the basic form of the microorganism culture apparatus of the present invention.

In a jacket-type apparatus, as illustrated in FIG. 7 which is a schematic cross-sectional view, each of the culture unit 1, the nutrient supply unit 2, and the environmental component supply unit 3 comprising the three-layer stacked structure 10 is formed by a frame body including a frame main body surrounding an internal space. Note that, the three-layer stacked structure 10 may have a circular shape, a triangular shape, a quadrangular shape, or any other polygonal shape in a plan view.

In other words, the culture unit 1 includes a first frame main body 14 that surrounds a first internal space 13, the nutrient supply unit 2 includes a second frame main body 24 that surrounds a second internal space 23, the environmental component supply unit 3 includes a third frame main body 34 that surrounds a third internal space 33, the first frame main body 14 can hold the microorganism-containing culture medium in the first internal space 13, the second frame main body 24 can hold the nutrient-containing material in the second internal space 23 or allow the nutrient-containing gas or the nutrient-containing liquid to flow through the second internal space 23, the third frame main body 34 can hold the environmental component-containing material in the third internal space 33 or allow the environmental component-containing gas or the environmental component-containing liquid to flow through the third internal space 33, and the first frame main body 14, the second frame main body 24, and the third frame main body 34 are connectable to each other in a stacked state. Further, the first frame main body 14, the second frame main body 24, and the third frame main body 34 may be attachable to and detachable from each other. Further, the second frame main body 24 may have the inflow path 27 for allowing a fluid to flow into the second internal space 23 and the outflow path 28 for allowing the fluid to flow out of the second internal space 23, and the third frame main body 34 have the inflow path 37 for allowing the fluid to flow into the third internal space 33 and the outflow path 38 for allowing the fluid to flow out of the third internal space 33. In this case, the inflow paths 27 and 37 and the outflow paths 28 and 38 of the second frame main body 24 and the third frame main body 34 may be each configured to be openable and closable, the second frame main body 24 be capable of holding the nutrient-containing material in the second internal space 23 in a state where both the inflow path 27 and the outflow path 28 are closed, and the third frame main body 34 be capable of holding the environmental component-containing material in the third internal space 33 in a state where both the inflow path 37 and the outflow path 38 are closed.

As described above, in the jacket-type apparatus, the culture unit 1 is composed of one jacket having a configuration in which the first frame main body 14 holds the microorganism-containing culture medium in the first internal space 13, the nutrient supply unit 2 is composed of one jacket having a configuration in which the second frame main body 24 holds the nutrient-containing material in the second internal space 23 or one jacket having a configuration in which the nutrient-containing gas or the nutrient-containing liquid is allowed to flow through the second internal space 23, and the environmental component supply unit 3 is composed of one jacket having a configuration in which the third frame main body 34 holds the environmental component-containing material in the third internal space 33 or one jacket having a configuration in which the environmental component-containing gas or the environmental component-containing liquid is allowed to flow through the third internal space 33. That is, the jacket-type apparatus is configured by stacking jackets. Note that, a membrane filter is optionally arranged between the jackets.

Furthermore, the culture unit 1 preferably includes the temperature sensor 41, the pH sensor 42, and the ultrasonic oscillator 43. Both the sensors 41 and 42 are provided so as to detect the culture state of microorganisms in the culture unit 1. In some aspects, the detection results by both the sensors 41 and 42 can be monitored by an external device (not illustrated). The ultrasonic oscillator 43 may be provided so as to apply ultrasonic vibration to the microorganism-containing culture medium held in the culture unit 1. The operation of the ultrasonic oscillator 43 may be controlled by the external device.

Note that, the three-layer stacked structure 10 of FIG. 7 has the configuration of FIG. 1, but may have the configurations of FIG. 2 to FIG. 5 and the like.

Printed Layer Type Apparatus

Figure 8:
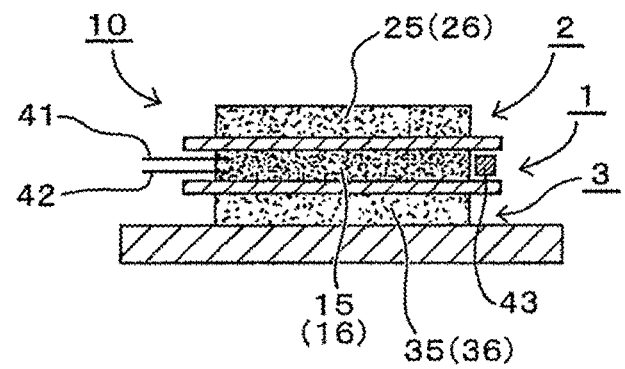
FIG. 8 is a schematic cross-sectional view illustrating a third example of the basic form of the microorganism culture apparatus of the present invention.

In a printing type apparatus, as illustrated in FIG. 8 which is a schematic cross-sectional view, the culture unit 1, the nutrient supply unit 2, and the environmental component supply unit 3 cpo the three-layer stacked structure 10 are each formed by printing. Note that, the three-layer stacked structure 10 may have a circular shape, a triangular shape, a quadrangular shape, or any other polygonal shape in a plan view.

That is, the culture unit 1 includes a first printed layer 15 configured of the microorganism-containing culture medium being printed, the nutrient supply unit 2 includes a second printed layer 25 configured of the nutrient-containing material being printed, and the environmental component supply unit 3 includes a third printed layer 35 configured of the environmental component-containing material being printed. Note that, it is preferable that a membrane filter 40 be arranged between the layers.

Printing can be performed using a dispenser. For example, in a case where the second printed layer 25 is formed, the nutrient-containing material is formed into a paste and then applied by a dispenser.

The first printed layer 15 preferably includes the temperature sensor 41, the pH sensor 42, and the ultrasonic oscillator 43. Both the sensors 41 and 42 are provided so as to detect the culture state of the microorganisms in the first printed layer 15. The detection results by both the sensors 41 and 42 can be preferably monitored by an external device (not illustrated). The ultrasonic oscillator 43 is provided so as to apply ultrasonic vibration to the microorganism-containing culture medium as the first printed layer 15. The operation of the ultrasonic oscillator 43 is preferably controlled by the external device.

Note that, the three-layer stacked structure 10 of FIG. 8 has the configuration of FIG. 1, but may have the configurations of FIG. 2 to FIG. 5 and the like.

Thin Film Type Apparatus. A thin film type apparatus is different from the printing type apparatus in that the thin film type apparatus includes a thin film body instead of the printed layer, and other configurations are the same. That is, a first thin film body 16, a second thin film body 26, and a third thin film body 36 are provided. The first thin film body 16 is configured of the microorganism-containing culture medium being thinned by a doctor blade method, the second thin film body 26 is configured of the nutrient-containing material being thinned by the doctor blade method, and the third thin film body 36 is configured of the environmental component-containing material being thinned by the doctor blade method. Note that, it is preferable that a membrane filter 40 be arranged between the thin film bodies.

The thinning by the doctor blade method can be performed, for example, as follows. For example, in a case where the second thin film body 26 is produced, the nutrient-containing material is formed into a slurry, placed on a carrier film, formed into a thin film having a predetermined thickness by a blade, and dried.

In some aspects, the disclosure provides a microorganism culture method (e.g., using the devices described herein) that can achieve various culture conditions, allowing for the culturing of fastidious or otherwise difficult to culture microorganisms.

A first microorganism culture method of the present invention includes at least one of a nutrient changing step of changing at least one of a type and a concentration of a nutrient-containing gas or a nutrient-containing liquid allowed to flow through the nutrient supply unit 2, and an environmental component changing step of changing at least one of a type and a concentration of an environmental component-containing gas or an environmental component-containing liquid allowed to flow through the environmental component supply unit 3. This method can be carried out using a microorganism culture apparatus in which the nutrient supply unit 2 is configured to allow the nutrient-containing gas or the nutrient-containing liquid to flow therethrough, or the environmental component supply unit 3 is configured to allow the environmental component-containing gas or the environmental component-containing liquid to flow therethrough. According to this method, the culture conditions for the culture unit 1 can be easily changed. Therefore, it is possible to achieve various culture conditions and obtain various difficult-to-culture microorganisms.

A second microorganism culture method of the present invention includes at least one of a nutrient exchange step of exchanging the nutrient supply unit 2 with another nutrient supply unit or with an environmental component supply unit, and an environmental component exchange step of exchanging the environmental component supply unit 3 with another environmental component supply unit or with a nutrient supply unit. This method can be carried out using a microorganism culture apparatus in which the nutrient supply unit 2 is provided so as to be exchangeable with another nutrient supply unit or exchangeable with the environmental component supply unit, or the environmental component supply unit 3 is provided so as to be exchangeable with another environmental component supply unit or exchangeable with the nutrient supply unit. According to this method, the culture conditions for the culture unit 1 can be easily changed. Therefore, it is possible to achieve various culture conditions and to study various difficult-to-culture microorganisms.

A third microorganism culture method according to the present invention includes a monitoring step of detecting and monitoring a culture state of the culture unit 1 by a sensor, and further includes at least one of a nutrient changing step of changing at least one of a type and a concentration of a nutrient-containing gas or a nutrient-containing liquid allowed to flow through the nutrient supply unit 2 and an environmental component changing step of changing at least one of a type and a concentration of an environmental component-containing gas or an environmental component-containing liquid allowed to flow through the environmental component supply unit 3, based on a monitoring result. This method can be carried out by using a microorganism culture apparatus in which the nutrient supply unit 2 is configured to allow the nutrient-containing gas or the nutrient-containing liquid to flow therethrough, or the environmental component supply unit 3 is configured to allow the environmental component-containing gas or the environmental component-containing liquid to flow therethrough, and further, the culture unit 1 includes one or more types of sensors for detecting a culture state. According to this method, the culture conditions for the culture unit 1 can be easily changed based on the monitoring result even in the middle of the culture. Therefore, optimal culture conditions can be easily achieved, and various difficult-to-culture microorganisms can be obtained.

A fourth microorganism culture method of the present invention includes a monitoring step of detecting and monitoring a culture state of the culture unit 1 by a sensor, and further includes at least one of a nutrient exchange step of exchanging the nutrient supply unit 2 with another nutrient supply unit or an environmental component supply unit and an environmental component exchange step of exchanging the environmental component supply unit 3 with another environmental component supply unit or a nutrient supply unit, based on a monitoring result. This method can be carried out by using a microorganism culture apparatus in which the nutrient supply unit 2 is provided so as to be exchangeable with another nutrient supply unit or exchangeable with an environmental component supply unit, or the environmental component supply unit 3 is provided so as to be exchangeable with another environmental component supply unit or exchangeable with a nutrient supply unit, and further, the culture unit 1 is provided with one or more types of sensors for detecting a culture state. According to this method, the culture conditions for the culture unit 1 can be easily changed based on the monitoring result even in the middle of the culture. Therefore, optimal culture conditions can be easily achieved, and various difficult-to-culture microorganisms can be obtained.

Next, specific embodiments of the microorganism culture devices and methods of the present invention will be described.

Figure 9:
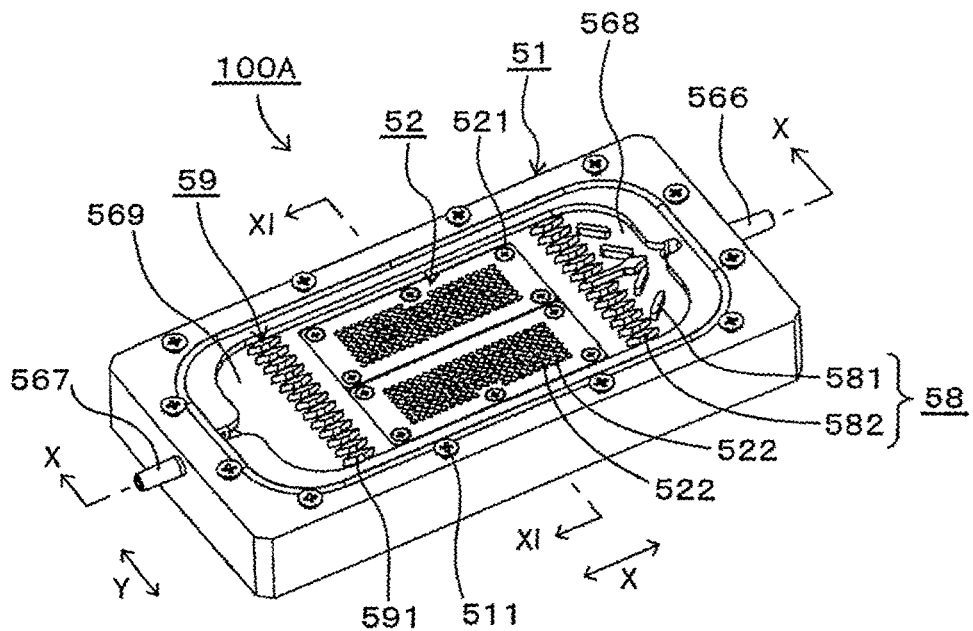
FIG. 9 is a perspective view illustrating a microorganism culture apparatus according to a first embodiment of the present invention.

FIG. 9 is a perspective view illustrating a microorganism culture apparatus according to a first embodiment of the present invention. The microorganism culture apparatus 100A has a configuration in which one three-layer stacked structure 10 is accommodated in one case 51, that is, the microorganism culture apparatus 100A is a three-layer integrated apparatus.

Figure 10:
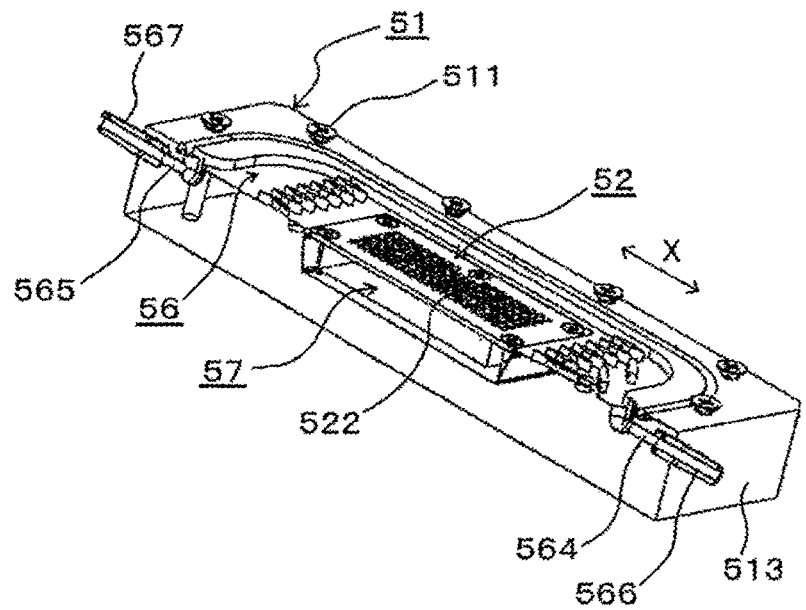
FIG. 10 is a cross-sectional view taken along a line X-X of FIG. 9.
Figure 11:
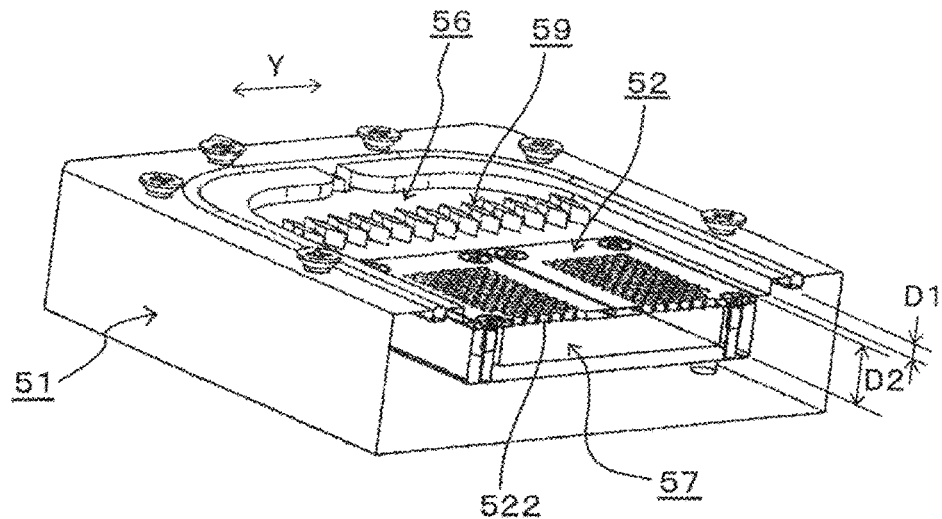
FIG. 11 is a cross-sectional view taken along a line XI-XI of FIG. 9.
Figure 12:
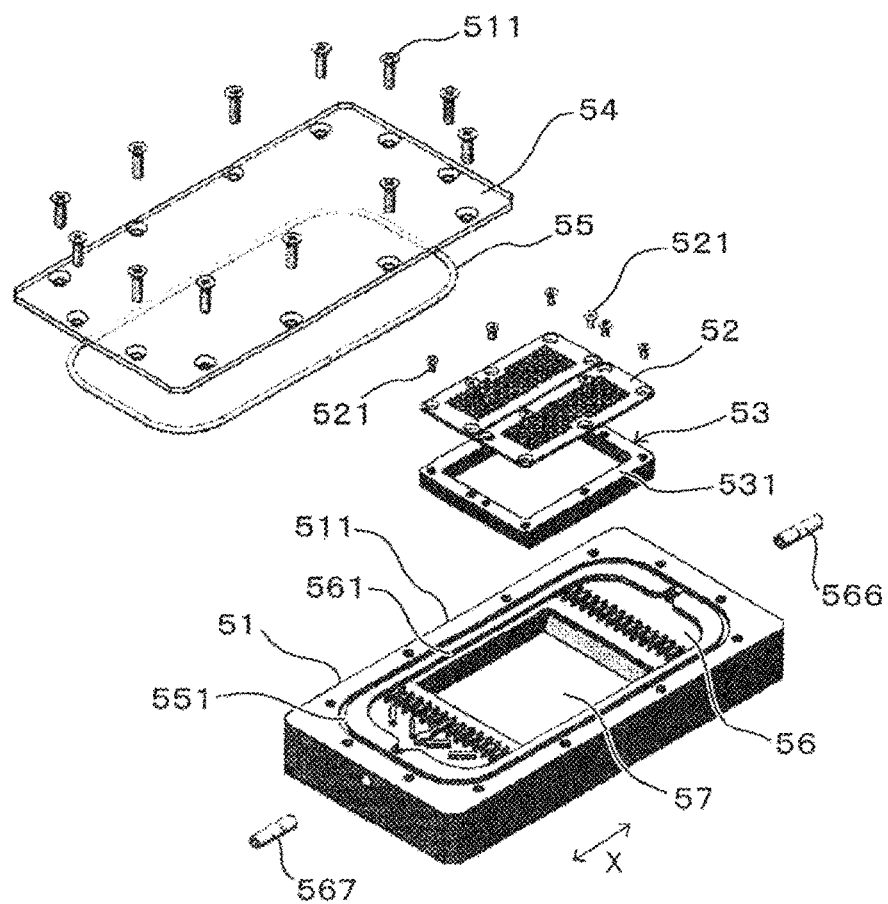
FIG. 12 is an exploded perspective view of the microorganism culture apparatus of FIG. 9.

FIG. 10 is a cross-sectional view taken along a line X-X of FIG. 9. FIG. 11 is a cross-sectional view taken along a line XI-XI of FIG. 9. FIG. 12 is an exploded perspective view of the microorganism culture apparatus 100A of FIG. 9. As illustrated in FIG. 12, the microorganism culture apparatus 100A has the case 51, a porous plate 52 and an attachment member 53 thereof, and a cover body 54 and a seal member 55 thereof.

The case 51 is a thin box body and has, on surfaces thereof, a first recess 56, a second recess 57, and the like that are press-molded. The first recess 56 has a depth D1. An outer peripheral edge 561 of the first recess 56 extends along a peripheral edge 511 in the vicinity of the peripheral edge 511 of the surface of the case 51. The second recess 57 has a depth D2. The second recess 57 is formed in a quadrangular shape in a plan view inside the first recess 56 and at a central portion in a length direction X of the case 51. D2>D1, where D2 is substantially half of a thickness of the case 51.

The recessed attachment member 53 is fitted into the second recess 57. The second recess 57 is closed by the porous plate 52 by fixing the porous plate 52 to a peripheral frame 531 of the attachment member 53 with a screw 521. The porous plate 52 has a large number of through-holes 522. The porous plate 52 is flush with a bottom surface of the first recess 56 in a state of closing the second recess 57.

The first recess 56 has an inflow path 564 for allowing a fluid to flow into the first recess 56 and an outflow path 565 for allowing the fluid to flow out of the first recess 56. On an upstream side of the first recess 56, the inflow path 564 extends upstream from the center of the first recess 56 in a width direction Y, passes through an upstream side surface 513 of the case 51, and is connected to a cylindrical body 566. On a downstream side of the first recess 56, the outflow path 565 extends downstream from the center of the first recess 56 in the width direction Y, passes through a downstream side surface 514 of the case 51, and is connected to a cylindrical body 567.

The first recess 56 has a rectifying rib 58 on a bottom surface 568 on the upstream side of the second recess 57, and has a rectifying rib 59 on a bottom surface 569 on the downstream side of the second recess 57. The rectifying rib 58 includes a front-stage rib 581 that is provided so as to uniformly divide a fluid having flowed in from the inflow path 564 in the width direction Y, and a posterior stage rib 582 that rectifies the fluid divided in the width direction Y along the length direction X. The large number of posterior stage ribs 582 are provided at equal intervals along the width direction Y. The rectifying rib 59 includes a large number of ribs 591 provided in the same manner as the posterior stage rib 582.

A seal groove 551 is formed around the first recess 56. The cover body 54 is fixed to the surface of the case 51 with a screw 512 in a state of pressing from above the seal member 55 fitted into the seal groove 551. The cover body 54 seals the first recess 56 and the second recess 57.

The environmental component-containing material is accommodated in the second recess 57 closed by the porous plate 52. Further, each of the large number of through-holes 522 of the porous plate 52 is filled with a culture medium seeded with microorganisms, i.e., a microorganism-containing culture medium. Since the environmental component-containing material is in contact with the microorganism-containing culture medium, the microorganisms on the porous plate 52 are supplied with the environmental component. In addition, the nutrient-containing liquid flows into the first recess 56 from the inflow path 564, flows on a surface of the porous plate 52, and flows out from the outflow path 565. That is, since the nutrient-containing liquid and the microorganism-containing culture medium come into contact with each other, the microorganisms on the porous plate 52 are supplied with nutrients. Therefore, the microorganism culture apparatus 100A includes, in the case 51, the three-layer stacked structure 10 including the layered environmental component supply unit configured such that the environmental component-containing material is accommodated in the second recess 57, the layered culture unit configured such that the through-hole 522 of the porous plate 52 is filled with the microorganism-containing culture medium, and the layered nutrient supply unit configured such that the nutrient-containing liquid flows through the first recess 56. Note that, membrane filters are arranged between the environmental component supply unit and the culture unit and between the nutrient supply unit and the culture unit.

Figure 13:
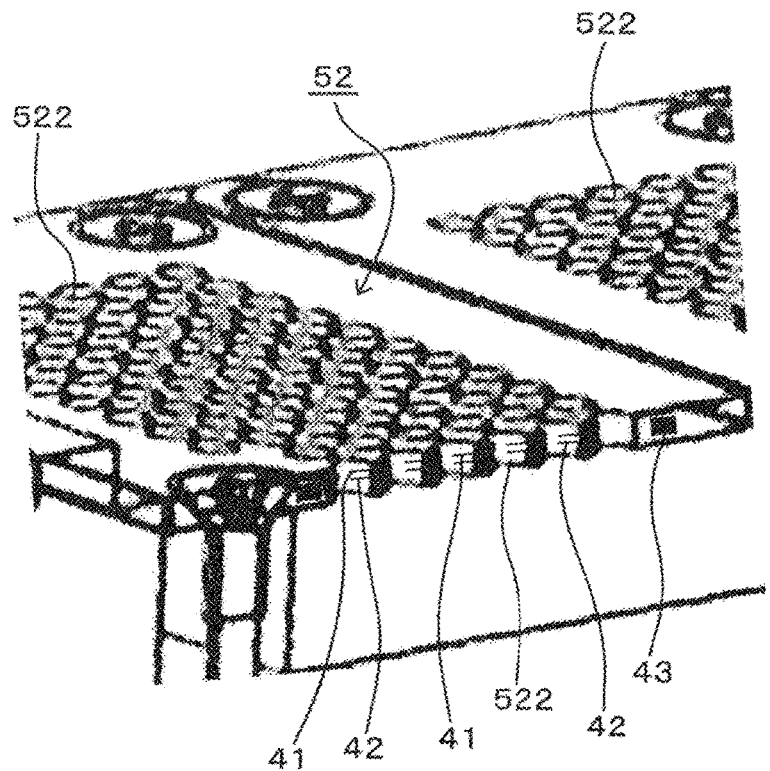
FIG. 13 is a partially enlarged view of FIG. 10.

As illustrated in FIG. 13, the porous plate 52 is provided with the temperature sensor 41, the pH sensor 42, and the ultrasonic oscillator 43. Both the sensors 41 and 42 are provided so as to detect the culture state of the microorganisms in each through-hole 522. The detection results of the sensors 41 and 42 can be monitored by an external device (not illustrated). The ultrasonic oscillator 43 is provided so as to apply ultrasonic vibration to the microorganism-containing culture medium in all the through-holes 522. The operation of the ultrasonic oscillator 43 is controlled by the external device.

The microorganism culture apparatus 100A as such can exhibit the following effects. Since environmental components can be supplied from a lower side and nutrients can be supplied from an upper side to the microorganisms in the through-holes 522 of the porous plate 52, the microorganisms can be cultured in the through-holes 522. Since the microorganism can be cultured only by allowing the nutrient-containing liquid to flow through the first recess 56, the microorganism can be cultured easily. Therefore, the possibility of acquisition of difficult-to-culture microorganisms can be improved. Since only one three-layer stacked structure 10 capable of culturing microorganisms is provided in the case 51, a very compact microorganism culture apparatus can be realized.

At least one of the type and the concentration of the nutrient-containing liquid allowed to flow through the first recess 56 can be changed (nutrient changing step). Therefore, various culture conditions can be easily achieved, and selection of culture conditions suitable for microorganisms can be easily performed. The temperature sensor 41 and/or the pH sensor 42 can detect and monitor the culture state of the microorganisms in the through-hole 522 (monitoring step). Therefore, the culture state can be determined quickly and accurately.

At least one of the type and the concentration of the nutrient-containing liquid allowed to flow through the first recess 56 can be changed based on the monitoring result (nutrient changing step). Therefore, culture conditions suitable for microorganisms can be easily achieved. Vibration can be applied to the microorganisms in the through-hole 522 by the ultrasonic oscillator 43, whereby the culture of the microorganisms can be activated. Therefore, the culture efficiency can be improved.

In the microorganism culture apparatus 100A of the first embodiment, the following modifications can be arbitrarily adopted. The nutrient-containing gas is allowed to flow through the first recess 56. The environmental component-containing liquid or the environmental component-containing gas is allowed to flow through the first recess 56. The nutrient-containing material is accommodated in the second recess 57. The nutrient-containing material is accommodated in the second recess 57, and the environmental component-containing liquid or the environmental component-containing gas is allowed to flow through the first recess 56.

Figure 14:
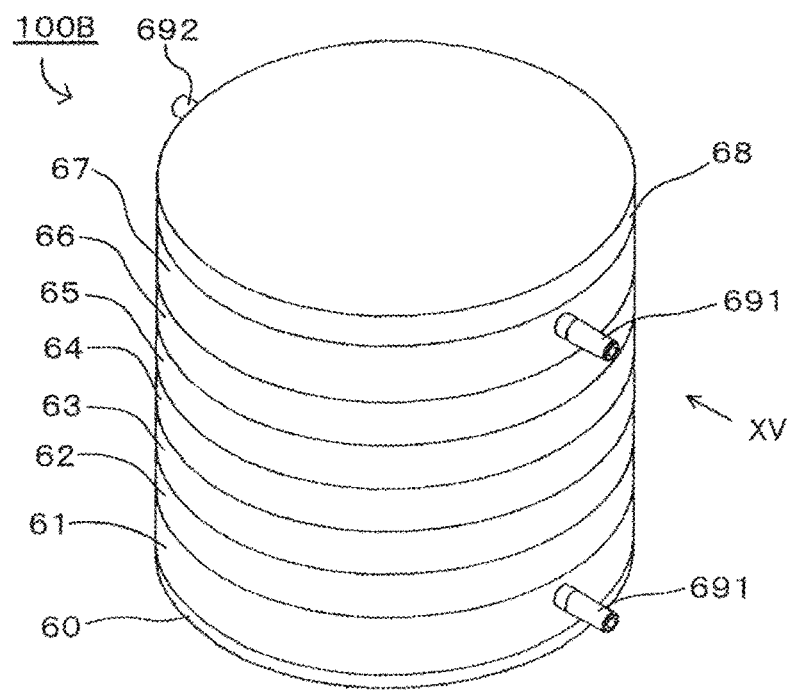
FIG. 14 is a perspective view illustrating a microorganism culture apparatus according to a second embodiment of the present invention.
Figure 15:
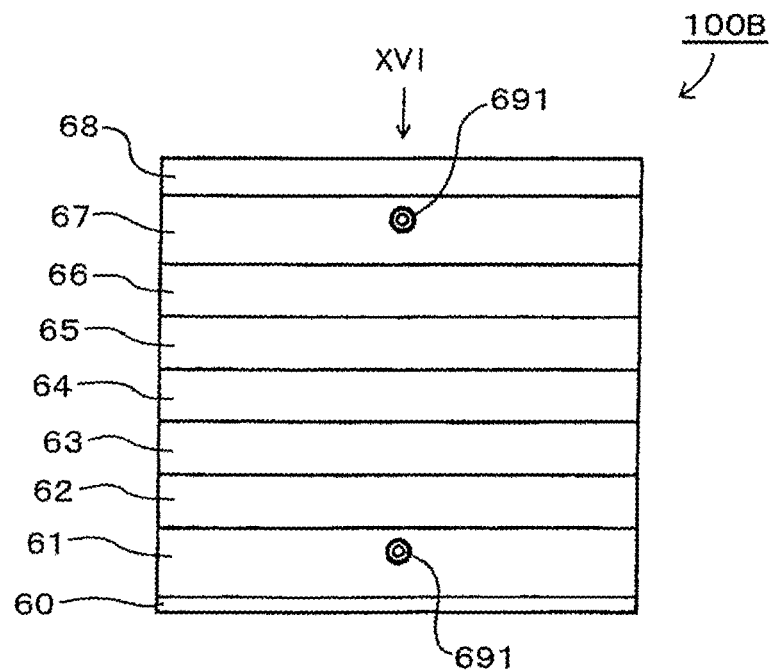
FIG. 15 is a view taken in a direction of an arrow XV in FIG. 14.
Figure 16:
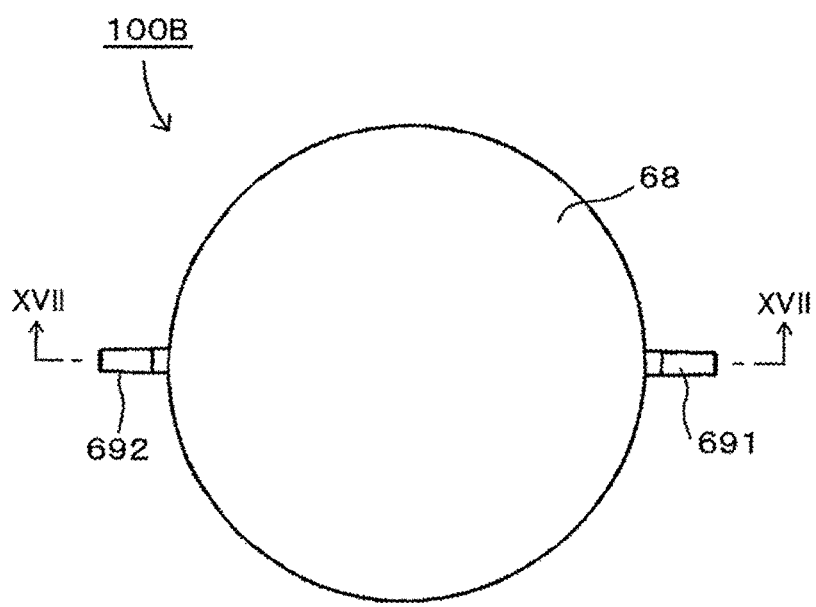
FIG. 16 is a view taken in a direction of an arrow XVI in FIG. 15 (plan view).
Figure 17:
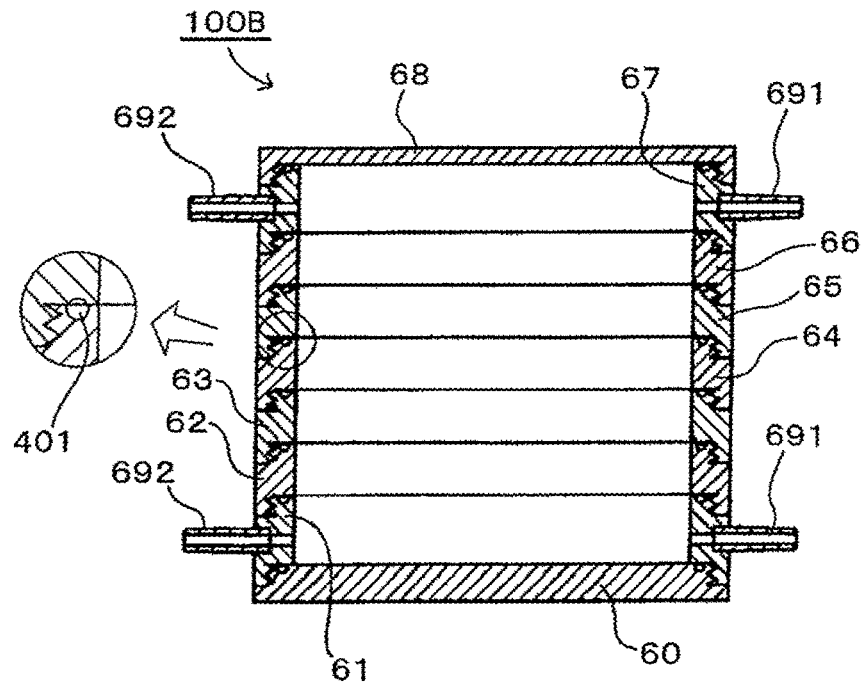
FIG. 17 is a cross-sectional view taken along a line XVII-XVII of FIG. 16.
Figure 18:
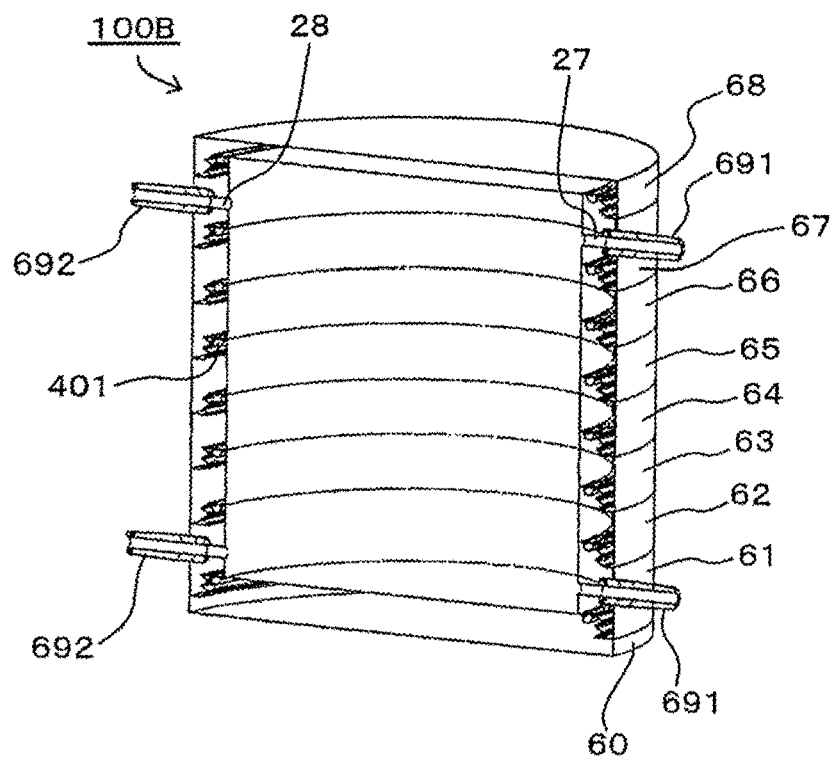
FIG. 18 is a perspective view of the cross section illustrated in FIG. 17.

FIG. 14 is a perspective view illustrating a microorganism culture apparatus according to a second embodiment of the present invention. This microorganism culture apparatus 100B is a "jacket-type apparatus". FIG. 15 is a view taken in a direction of an arrow XV in FIG. 14. FIG. 16 is a view taken in a direction of an arrow XVI (plan view) in FIG. 15. FIG. 17 is a cross-sectional view taken along a line XVII-XVII of FIG. 16. FIG. 18 is a perspective view of the cross-section illustrated in FIG. 17.

Figure 19:
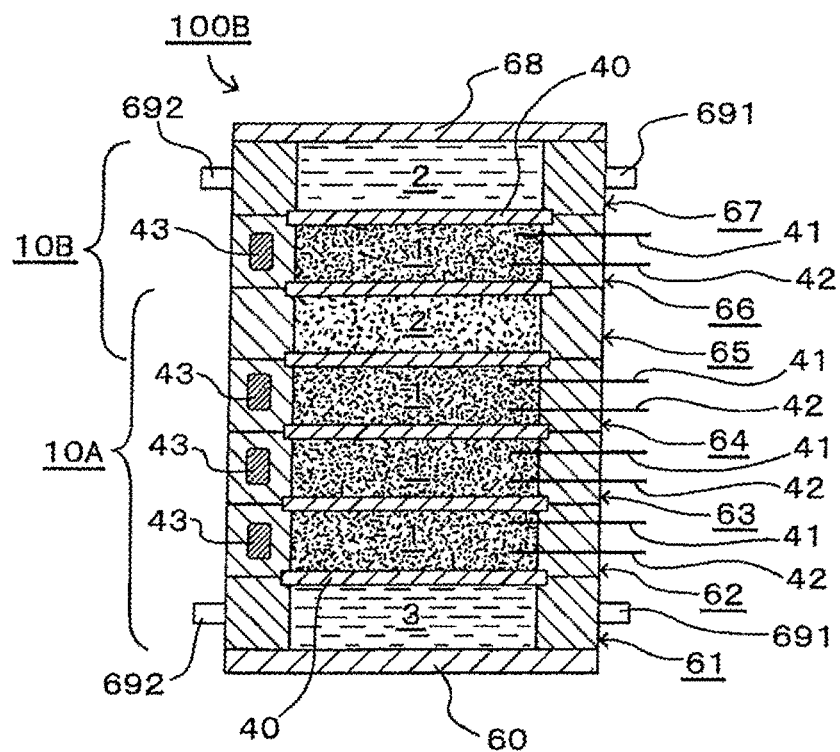
FIG. 19 is a schematic view of the cross section illustrated in FIG. 17.

The microorganism culture apparatus 100B is configured by stacking seven jackets 61 to 67. The jacket 61 is stacked on a base 60, and the jacket 67 is closed by a lid body 68. As illustrated in FIG. 19 which is a schematic cross-sectional view, in the apparatus 100B, the jacket 61 is the environmental component supply unit 3, the jackets 62 to 64 and 66 are the culture unit 1, and the jackets 65 and 67 are the nutrient supply unit 2. The apparatus 100B includes two sets of three-layer stacked structures 10A and 10B, that is, includes the three-layer stacked structure 10A composed of jackets 61 to 65 by regarding the jackets 62 to 64 as one culture unit and the three-layer stacked structure 10B composed of jackets 65 to 67.

Figure 20:
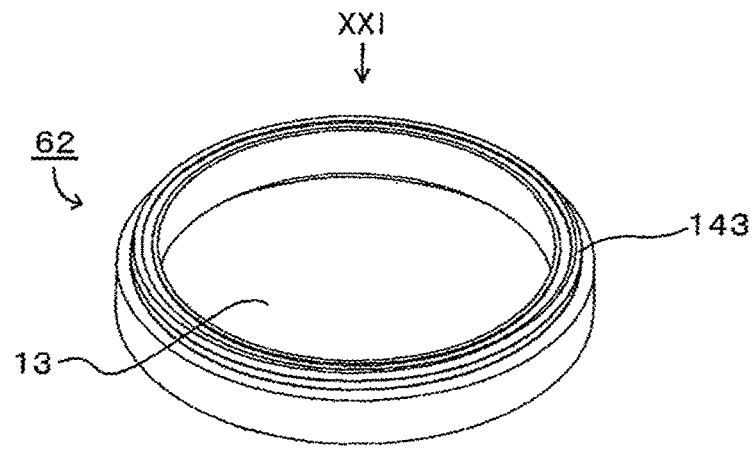
FIG. 20 is a perspective view of a jacket serving as a culture unit.
Figure 21:
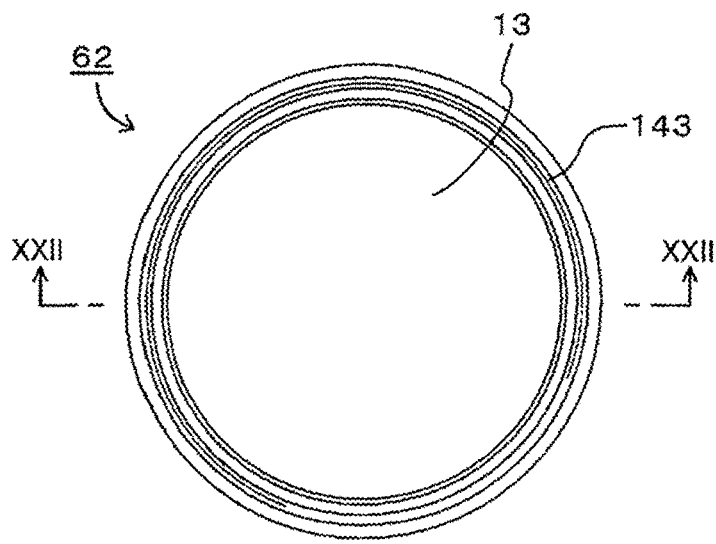
FIG. 21 is a view taken in a direction of an arrow XXI in FIG. 20.
Figure 22:
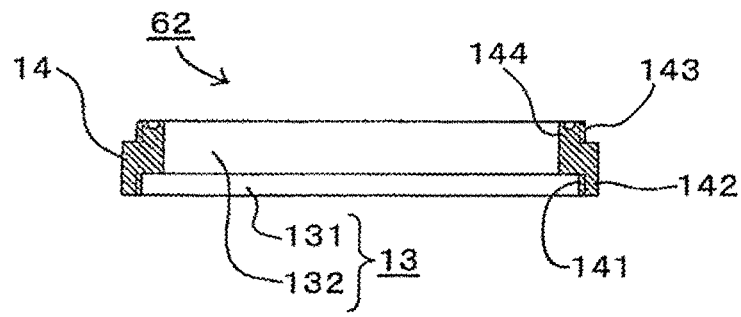
FIG. 22 is a cross-sectional view taken along a line XXII-XXII of FIG. 21.

As illustrated in FIG. 20 to FIG. 22, the jacket 62 serving as the culture unit 1 includes the annular first frame main body 14 surrounding the first internal space 13. FIG. 20 is a perspective view of the jacket 62. FIG. 21 is a view taken in a direction of an arrow XXI in FIG. 20. FIG. 22 is a cross-sectional view taken along a line XXII-XXII of FIG. 21. The first frame main body 14 has an outer fitting portion 142 having an internal screw 141 at a lower portion thereof, and has an inner fitting portion 144 having an external screw 143 at an upper portion thereof. The outer fitting portion 142 has a dimension capable of being externally fitted to the inner fitting portion 144. The inner fitting portion 144 has a dimension capable of being internally fitted to the outer fitting portion 142. The first internal space 13 includes an internal space 131 surrounded by the outer fitting portion 142 and an internal space 132 other than the internal space 131. The first frame main body 14 holds the microorganism-containing culture medium in the internal space 132. Note that, in FIG. 20 to FIG. 22, the microorganism-containing culture medium is not illustrated. The jackets 63, 64, and 66 also have the same configuration as that of the jacket 62. The jacket 65 serving as the nutrient supply unit 2 includes an annular second frame main body surrounding the second internal space. Note that, in the 100B of the present apparatus, the jacket 65 has the same configuration as that of the jacket 62. However, the nutrient-containing material is held within the internal space 132.

Figure 23:
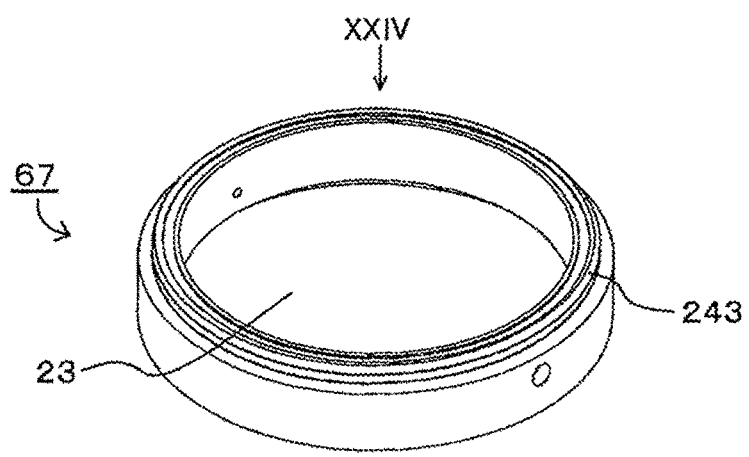
FIG. 23 is a perspective view of a jacket serving as a nutrient supply unit.
Figure 24:
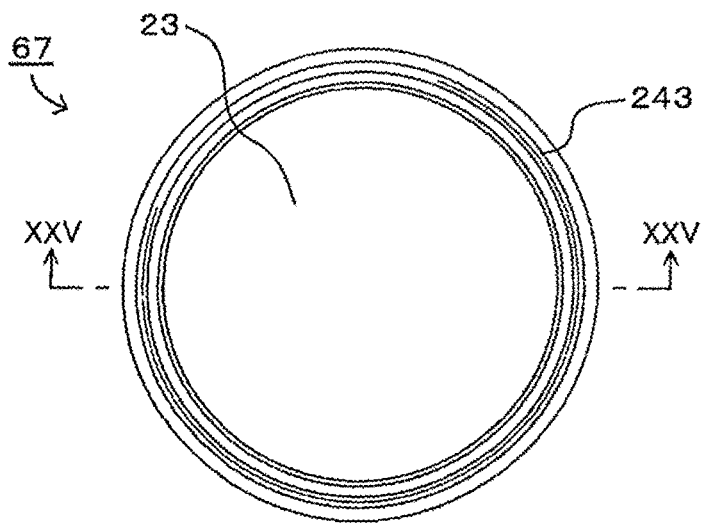
FIG. 24 is a view taken in a direction of an arrow XXIV in FIG. 23.
Figure 25:
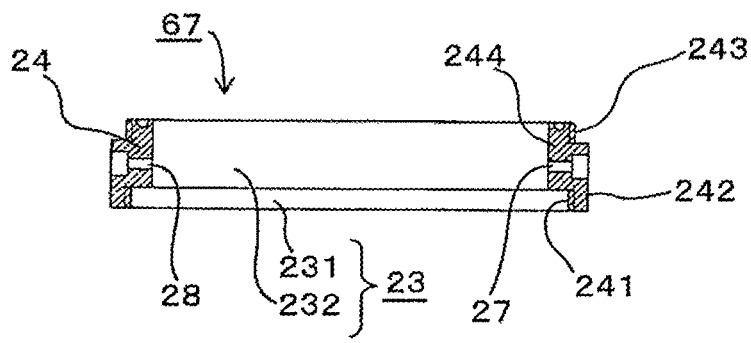
FIG. 25 is a cross-sectional view taken along a line XXV-XXV of FIG. 24.
Figure 26:
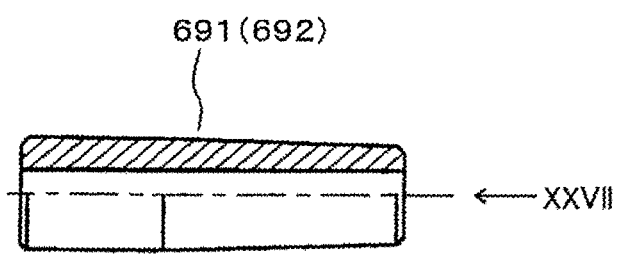
FIG. 26 is a partial cross-sectional view of a cylindrical body.
Figure 27:
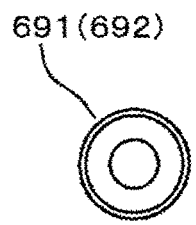
FIG. 27 is a view taken in a direction of an arrow XXVII in FIG. 26.

As illustrated in FIG. 23 to FIG. 25, the jacket 67 serving as the nutrient supply unit 2 includes the annular second frame main body 24 surrounding the second internal space 23. FIG. 23 is a perspective view of the jacket 67. FIG. 24 is a view taken in a direction of an arrow XXIV in FIG. 23. FIG. 25 is a cross-sectional view taken along a line XXV-XXV of FIG. 24. The second frame main body 24 has an outer fitting portion 242 having an internal screw 241 at a lower portion thereof, and has an inner fitting portion 244 having an external screw 243 at an upper portion thereof. The outer fitting portion 242 has a dimension capable of being externally fitted to the inner fitting portion 244. The inner fitting portion 244 has a dimension capable of being internally fitted to the outer fitting portion 242. The second internal space 23 includes an internal space 231 surrounded by the outer fitting portion 242 and an internal space 232 other than the internal space 231. Further, the second frame main body 24 has the inflow path 27 for allowing a fluid to flow into the internal space 232 and the outflow path 28 for allowing the fluid to flow out of the internal space 232. The fluid is the nutrient-containing liquid or the nutrient-containing gas. Further, cylindrical bodies 691 and 692 illustrated in FIG. 26 are connected to the inflow path 27 and the outflow path 28, respectively, and project radially outward. FIG. 27 is a view taken in a direction of an arrow XXVII in FIG. 26. The inflow path 27 and the outflow path 28 can be closed by closing plugs (not illustrated) instead of the cylindrical bodies 691 and 692. Thus, the inflow path 27 and the outflow path 28 can be opened and closed. The jacket 61 serving as the environmental component supply unit 3 includes an annular third frame main body surrounding the third internal space. Note that, in the apparatus 100B, the jacket 61 has the same configuration as that of the jacket 67. However, the environmental component-containing liquid or the environmental component-containing gas is allowed to flow through the internal space 232.

Figure 28:
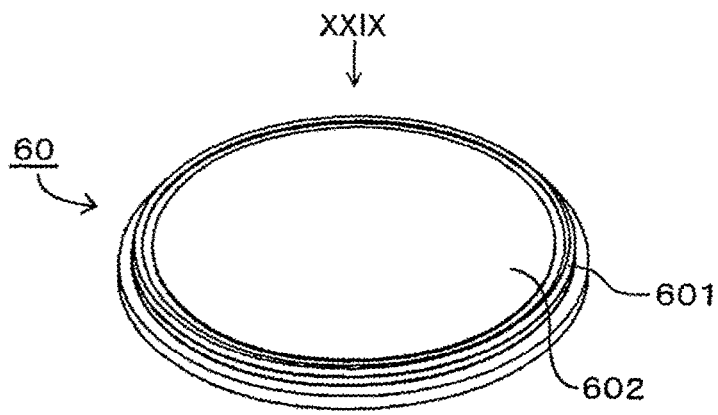
FIG. 28 is a perspective view of a base.
Figure 29:
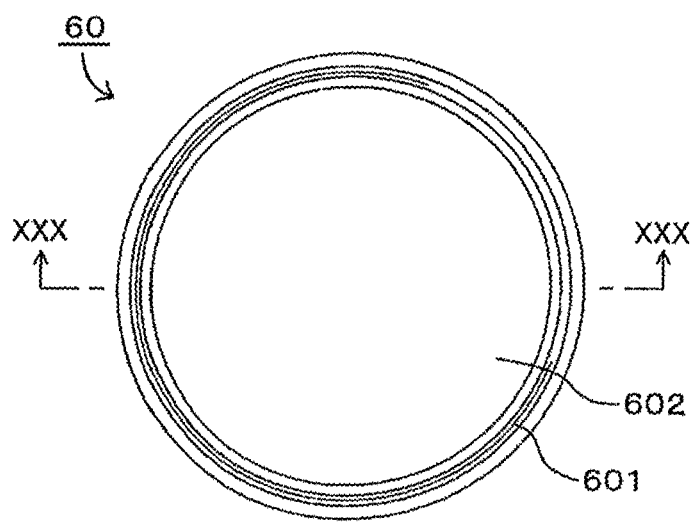
FIG. 29 is a view taken in a direction of an arrow XXIX in FIG. 28.
Figure 30:
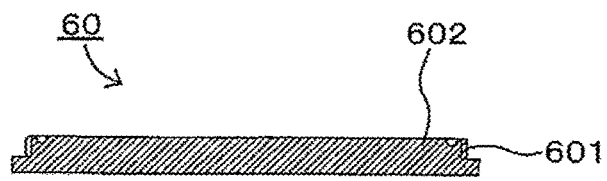
FIG. 30 is a cross-sectional view taken along a line XXX-XXX of FIG. 29

FIG. 28 to FIG. 30 illustrate the base 60. FIG. 28 is a perspective view of the base 60. FIG. 29 is a view taken in a direction of an arrow XXIX in FIG. 28. FIG. 30 is a cross-sectional view taken along a line XXX-XXX of FIG. 29. The base 60 is an annular plate body, and has an inner fitting portion 602 having an external screw 601 on an upper portion thereof. The inner fitting portion 602 has a dimension capable of being internally fitted to each of the outer fitting portion 142 of the first frame main body 14 and the outer fitting portion 242 of the second frame main body 24.

Figure 31:
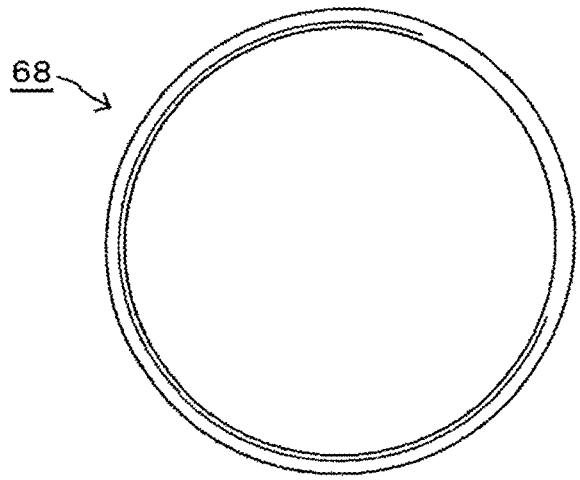
FIG. 31 is a plan view of a lid body.
Figure 32:
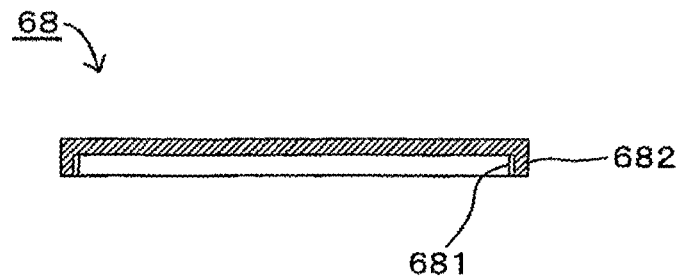
FIG. 32 is a cross-sectional view taken along a line XXXII-XXXII of FIG. 31.

FIG. 31 and FIG. 32 illustrate the lid body 68. FIG. 31 is a plan view of the lid body 68. FIG. 32 is a cross-sectional view taken along a line XXXII-XXXII of FIG. 31. The lid body 68 is an annular plate body, and has an outer fitting portion 682 having an internal screw 681 at a lower portion thereof. The outer fitting portion 682 has a dimension capable of being externally fitted to each of the inner fitting portion 144 of the first frame main body 14 and the inner fitting portion 244 of the second frame main body 24. The jacket 61 is externally fitted and connected to the base 60 by screwing the outer fitting portion 242 to the inner fitting portion 602 of the base 60, and thus is stacked. In addition, the jackets 62 to 67 are externally fitted and connected to each other as well by screwing the outer fitting portions to the inner fitting portions of the jackets located below, and thus are stacked. The lid body 68 is externally fitted and connected to the jacket 67 by screwing the outer fitting portion 682 to the inner fitting portion 244 of the jacket 67. Note that, the membrane filter 40 is arranged between the upper and lower jackets so as to partition them. In addition, a portion between the jackets is sealed by an O-ring 401 (FIG. 17). Thus, the apparatus 100B includes the jackets 61 to 67 having a seven-layer structure.

Furthermore, as illustrated in FIG. 19, the temperature sensor 41, the pH sensor 42, and the ultrasonic oscillator 43 are provided in each of the jackets 62 to 64 and 66 serving as the culture unit 1. The temperature sensor 41 and the pH sensor 42 are arranged so as to detect the temperature and the pH of the microorganism-containing culture medium held in the first internal space 13, and pass through the first frame main body 14 from the inside to the outside to be connected to an external device (not illustrated). The external device can monitor the temperature and pH of the microorganism-containing culture medium via both the sensors 41 and 42. The ultrasonic oscillator 43 is arranged inside the first frame main body 14 so as to apply vibration to the microorganism-containing culture medium held in the first internal space 13. The operation of the ultrasonic oscillator 43 is controlled by the external device.

The microorganism culture apparatus 100B as such can exhibit the following effects. Since the environmental component can be supplied from a lower side and the nutrient can be supplied from an upper side to the microorganisms in the jackets 62 to 64 by allowing the environmental component-containing liquid to flow through the jacket 61, the microorganisms can be cultured in the jackets 62 to 64. In addition, since the nutrient can be supplied to the microorganism in the jacket 66 from both the lower side and the upper side by allowing the nutrient-containing liquid to flow through the jacket 67, the microorganism can be cultured in the jacket 66. Since the two sets of three-layer stacked structures 10A and 10B are provided and culture conditions thereof are different from each other, two types of culture conditions can be performed. Therefore, it is possible to improve the efficiency of the operation of selecting the culture conditions, and thus it is possible to improve the possibility of acquiring the difficult-to-culture microorganisms. In the jackets 62 to 64, since the culture unit has the three-layer structure, culture conditions are different for each layer. For example, the concentration of the environmental component to be supplied is highest in the jacket 62 and lowest in the jacket 64. Further, the concentration of the nutrient to be supplied is highest in the jacket 64 and lowest in the jacket 62. Therefore, it is possible to improve the efficiency of the operation of selecting the culture conditions, and thus it is possible to improve the possibility of acquiring the difficult-to-culture microorganisms. Since the microorganism can be cultured only by allowing the environmental component-containing liquid to flow through the jacket 61 and allowing the nutrient-containing liquid to flow through the jacket 67, the microorganism can be cultured easily. Therefore, the possibility of acquisition of difficult-to-culture microorganisms can be improved. Since the jacket can be assembled only by connecting the jackets to each other, the productivity of the apparatus can be improved.

The jacket can be easily removed by releasing the connection, and another alternative jacket can be newly connected. That is, the jacket can be easily exchanged. Therefore, the culture conditions can be easily changed, and the efficiency of the operation of selecting the culture conditions can be improved, thereby improving the possibility of acquiring the difficult-to-culture microorganisms. For example, the jacket 65 and/or the jacket 67 serving as a nutrient supply unit can be exchanged with a jacket serving as another nutrient supply unit or exchanged with a jacket serving as the environmental component supply unit (nutrient exchange step). In addition, the jacket 61 serving as the environmental component supply unit can be exchanged with a jacket serving as another environmental component supply unit or exchanged with a jacket serving as the nutrient supply unit (environmental component exchange step).

The number of three-layer stacked structures can be increased by increasing the number of jackets. The culture conditions can be made different for each three-layer stacked structure. Therefore, it is possible to improve the efficiency of the operation of selecting the culture conditions, and thus it is possible to improve the possibility of acquiring the difficult-to-culture microorganisms.

At least one of the type and the concentration of the nutrient-containing liquid allowed to flow through the jacket 65 and/or the jacket 67 can be changed (nutrient changing step). In addition, at least one of the type and the concentration of the environmental component-containing liquid allowed to flow through the jacket 61 can be changed (environmental component changing step). Therefore, various culture conditions can be easily achieved, and selection of culture conditions suitable for microorganisms can be easily performed.

The culture state of the microorganisms in the jackets 62 to 64 and 66 can be detected and monitored by the temperature sensor 41 and/or the pH sensor 42 (monitoring step). Therefore, the culture state in each jacket can be determined quickly and accurately.

Based on the monitoring result, at least one of the type and the concentration of the nutrient-containing liquid allowed to flow through the jacket 65 and/or the jacket 67 can be changed (nutrient changing step), and at least one of the type and the concentration of the environmental component-containing liquid allowed to flow through the jacket 61 can be changed (environmental component changing step). Therefore, the culture conditions suitable for the microorganism can be easily achieved even in the middle of the culture.

The culture can be activated by applying vibration to the microorganisms in the jacket by the ultrasonic oscillator 43. Therefore, the culture efficiency can be improved.

In the microorganism culture apparatus 100B of the second embodiment, the following modifications can be arbitrarily adopted.

Figure 33:
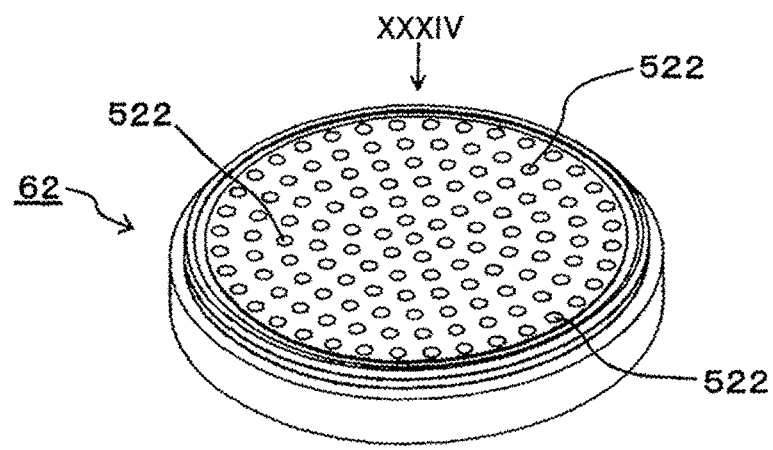
FIG. 33 is a perspective view of a modified example of a jacket serving as a culture unit.
Figure 34:
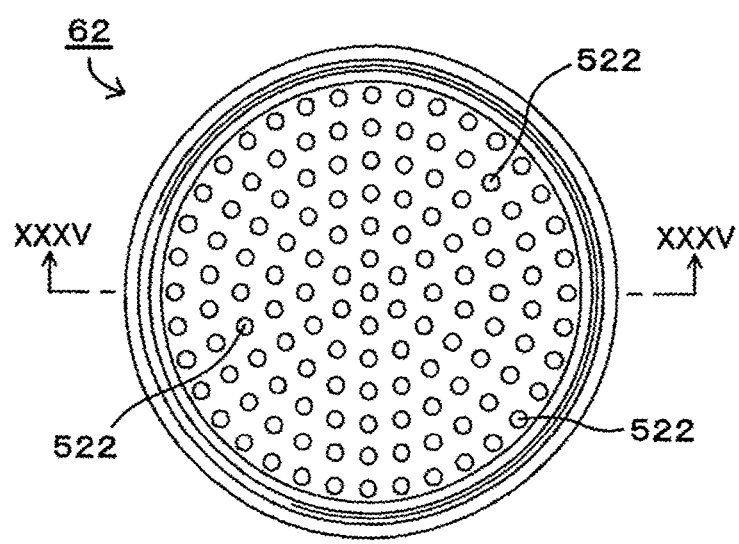
FIG. 34 is a view taken in a direction of an arrow XXXIV in FIG. 33.
Figure 35:
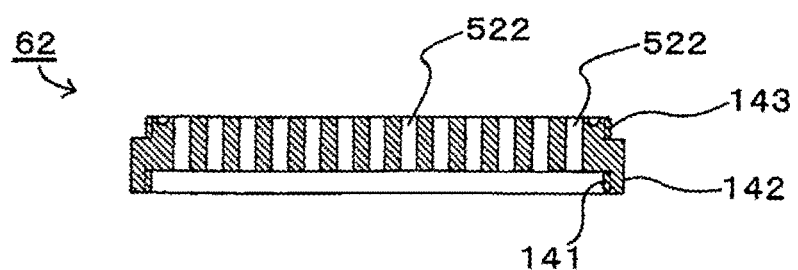
FIG. 35 is a cross-sectional view taken along a line XXXV-XXXV of FIG. 34.

In the jacket 62 illustrated in FIG. 33 to FIG. 35, the first internal space 13 is configured of a large number of through-holes 522. FIG. 33 is a perspective view of the jacket 62. FIG. 34 is a view taken in a direction of an arrow XXXIV in FIG. 33. FIG. 35 is a cross-sectional view taken along a line XXXV-XXXV of FIG. 34. The jacket 62 serving as the culture unit 1 is formed of a plate body having the outer fitting portion 142, and the external screw 143 and the large number of through-holes 522 are formed in the plate body. In the jacket 62, all the through-holes 522 are filled with the microorganism-containing culture medium.

Figure 36:
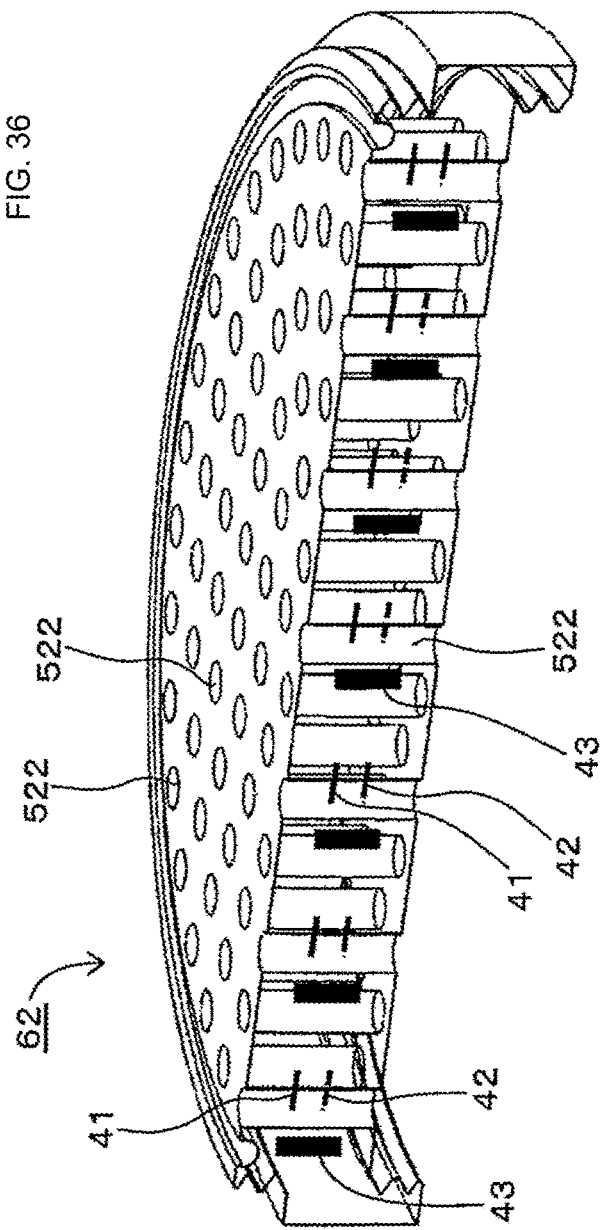
FIG. 36 is an enlarged cross-sectional perspective view of the jacket of FIG. 33.

As illustrated in FIG. 36, the temperature sensor 41, the pH sensor 42, and the ultrasonic oscillator 43 are provided in the jacket 62 having the large number of through-holes 522. These are provided for each of the through-holes 522. The temperature sensor 41 and the pH sensor 42 are arranged inside the jacket 62 so as to detect the temperature and the pH of the microorganism-containing culture medium filled in the through-hole 522, and are connected to an external device (not illustrated). The external device can monitor the temperature and pH of the microorganism-containing culture medium via both the sensors 41 and 42. The ultrasonic oscillator 43 is arranged inside the jacket 62 so as to apply vibration to the microorganism-containing culture medium filled in the through-hole 522.

The connection between the jackets is not limited to a screwing mechanism using an internal screw and an external screw, and for example, a slide fitting mechanism, a concave-convex fitting mechanism, or an external connection member can be adopted.

The number of stacked jackets is not limited to seven, and it is sufficient that one or more three-layer stacked structures can be formed. Further, in a case where two or more three-layer stacked structures are provided, adjacent three-layer stacked structures may share a jacket such as the jacket 65.

The internal space 132 of the jacket 62 serving as the culture unit 1 may be a space arbitrarily partitioned in a lateral direction or a space arbitrarily partitioned in a vertical direction.

Figure 37:
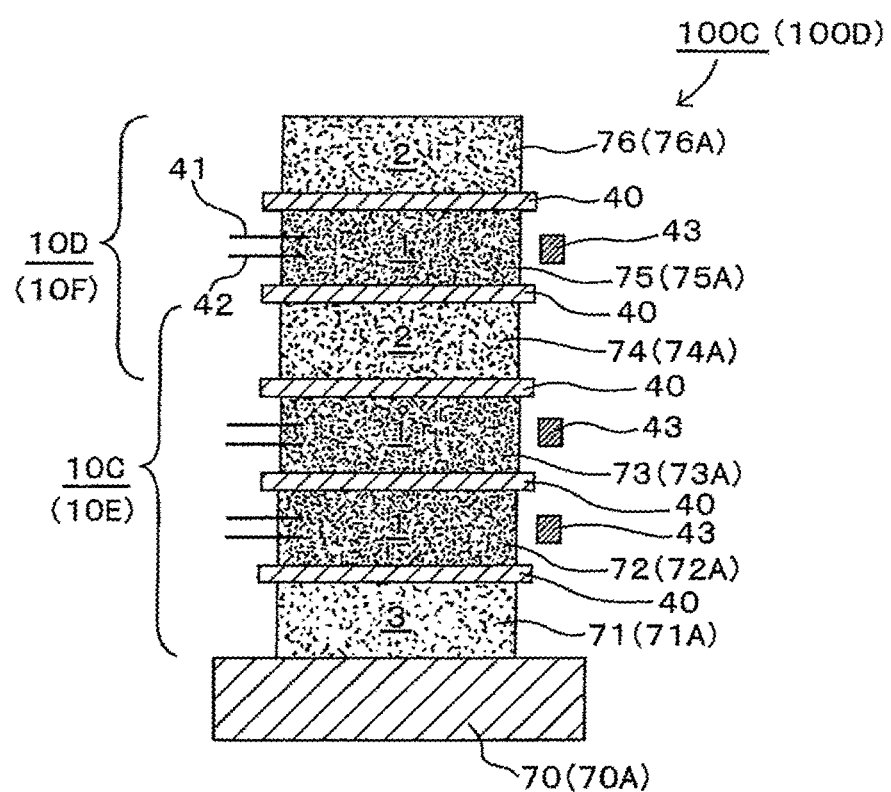
FIG. 37 is a schematic cross-sectional view illustrating a microorganism culture apparatus according to a third embodiment of the present invention.

FIG. 37 is a schematic cross-sectional view illustrating a microorganism culture apparatus according to a third embodiment of the present invention. This microorganism culture apparatus 100C is a "printed layer type apparatus".

The microorganism culture apparatus 100C is configured of a first printed layer 71 to a sixth printed layer 76 being stacked on a base 70. Note that, each of the printed layers may have a circular shape, a triangular shape, a quadrangular shape, or any other polygonal shape in a plan view.

The first printed layer 71 is the environmental component supply unit 3 made of the environmental component-containing material being printed. The second printed layer 72, the third printed layer 73, and the fifth printed layer 75 are the culture unit 1 made of the microorganism-containing culture medium being printed. The fourth printed layer 74 and the sixth printed layer 76 are the nutrient supply unit 2 made of the nutrient-containing material being printed. Therefore, the apparatus 100C includes two sets of three-layer stacked structures 10C and 10D, that is, includes the three-layer stacked structure 10C composed of the first printed layer 71 to the fourth printed layer 74 and the three-layer stacked structure 10D composed of the fourth printed layer 74 to the sixth printed layer 76. Note that, the membrane filter 40 is arranged between the layers.

Figure 38:
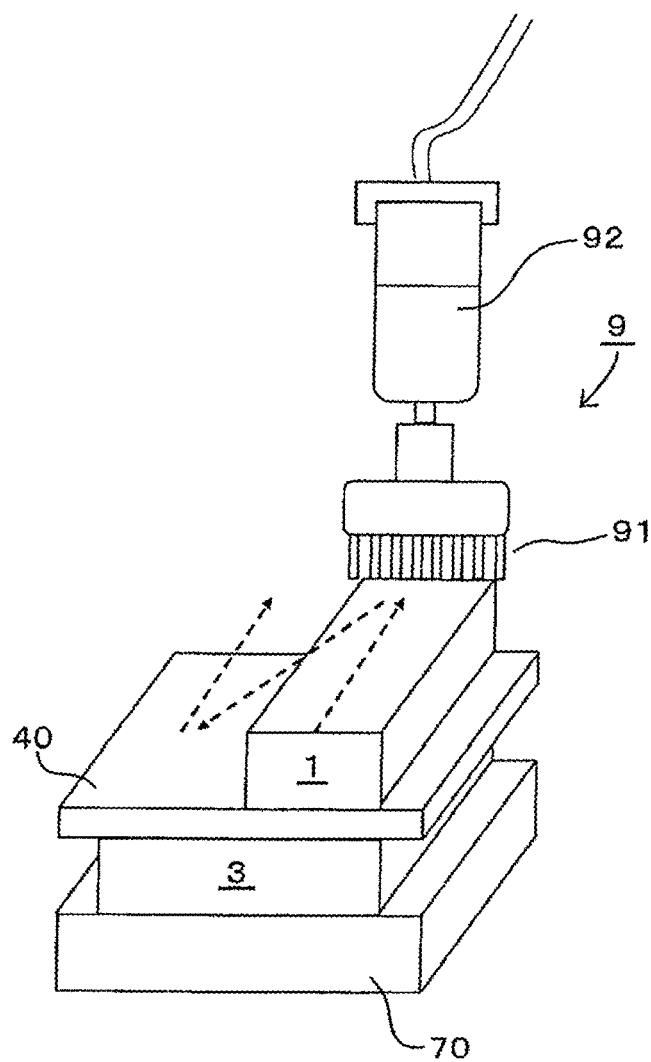
FIG. 38 is a perspective view of an apparatus used for manufacturing an apparatus of FIG. 37.

The microorganism culture apparatus 100C is produced using the apparatus illustrated in FIG. 38. This apparatus 9 is a dispenser with a multi-needles 91. In the apparatus 9, a printing material stored in a tank 92 is discharged from the multi-needles 91 while moving the multi-needles 91, thereby forming a printed layer. The printing material is a paste-like microorganism-containing culture medium in the case of the culture unit 1, a paste-like nutrient-containing material in the case of the nutrient supply unit 2, and a paste-like environmental component-containing material in the case of the environmental component supply unit 3. In the case of the apparatus 100C, first, a paste-like environmental component-containing material is discharged onto the base 70 to form the first printed layer 71, the membrane filter 40 is placed thereon, a paste-like microorganism-containing culture medium is discharged thereon to form the second printed layer 72, the membrane filter 40 is placed thereon, a paste-like microorganism-containing culture medium is discharged thereon to form the third printed layer 73, the membrane filter 40 is placed thereon, a paste-like nutrient-containing material is discharged thereon to form the fourth printed layer 74, the membrane filter 40 is placed thereon, a paste-like microorganism-containing culture medium is discharged thereon to form the fifth printed layer 75, the membrane filter 40 is placed thereon, and a paste-like nutrient-containing material is discharged thereon to form the sixth printed layer 76.

Further, the temperature sensor 41, the pH sensor 42, and the ultrasonic oscillator 43 are provided in each of the second printed layer 72, the third printed layer 73, and the fifth printed layer 75 which is the culture unit. The temperature sensor 41 and the pH sensor 42 are arranged so as to detect the temperature and the pH of the microorganism-containing culture medium in each printed layer, and are connected to an external device (not illustrated). The external device can monitor the temperature and the pH of the microorganism-containing culture medium via both the sensors 41 and 42. The ultrasonic oscillator 43 is arranged so as to apply vibration to the microorganism-containing culture medium of each printed layer. The operation of the ultrasonic oscillator 43 is controlled by the external device.

The microorganism culture apparatus 100C as such can exhibit the following effects.

Since environmental components can be supplied from a lower side and nutrients can be supplied from an upper side to the microorganisms in the second printed layer 72 and the third printed layer 73, the microorganisms can be cultured in the second printed layer 72 and the third printed layer 73. In addition, since nutrients can be supplied to the fifth printed layer 75 from both the lower side and the upper side, microorganisms can be cultured in the fifth printed layer 75.

Since the two sets of three-layer stacked structures 10C and 10D are provided and culture conditions thereof are different from each other, two types of culture conditions can be performed. Therefore, it is possible to improve the efficiency of the operation of selecting the culture conditions, and thus it is possible to improve the possibility of acquiring the difficult-to-culture microorganisms.

In the second printed layer 72 and the third printed layer 73, since the culture unit has a two-layer structure, culture conditions are different for each layer. For example, the concentration of the environmental component to be supplied is higher in the second printed layer 72, and the concentration of the nutrient to be supplied is higher in the third printed layer 73. Therefore, it is possible to improve the efficiency of the operation of selecting the culture conditions, and thus it is possible to improve the possibility of acquiring the difficult-to-culture microorganisms. Since the microorganism can be cultured only by forming the printed layer to configure the three-layer stacked structure, the culture of the microorganism can be easily performed. Therefore, the possibility of acquisition of difficult-to-culture microorganisms can be improved. Since the assembly can be performed only by forming the printed layer, the productivity of the apparatus can be improved.

The number of three-layer stacked structures can be increased by increasing the number of printed layers. The culture conditions can be made different for each three-layer stacked structure. Therefore, it is possible to improve the efficiency of the operation of selecting the culture conditions, and thus it is possible to improve the possibility of acquiring the difficult-to-culture microorganisms.

The culture state of the microorganisms in the second printed layer 72, the third printed layer 73, and the fifth printed layer 75 can be detected and monitored by the temperature sensor 41 and/or the pH sensor 42 (monitoring step). Therefore, the culture state in each printed layer can be determined quickly and accurately.

The culture can be activated by applying vibration to the microorganisms in the second printed layer 72, the third printed layer 73, and the fifth printed layer 75 by the ultrasonic oscillator 43. Therefore, the culture efficiency can be improved.

In the microorganism culture apparatus 100C of the third embodiment, the following modifications can be arbitrarily adopted.

The number of stacked printed layers is not limited to six, and it is sufficient that one or more three-layer stacked structures can be formed. In addition, in a case where two or more three-layer stacked structures are provided, adjacent three-layer stacked structures may share a printed layer such as the fourth printed layer 74. The printed layer may be formed, not limited to a method using a dispenser, by the following method. A printing material for coating is applied onto a PET film using a coater, and punched out into a desired size with a die to form a multilayer body.

A microorganism culture apparatus according to a fourth embodiment of the present invention is a thin film type apparatus. This microorganism culture apparatus 100D has the same configuration as that of the "printed layer type apparatus" of the third embodiment illustrated in FIG. 37, but includes a thin film body instead of the printed layer.

The microorganism culture apparatus 100D is configured of a first thin film body 71A to a sixth thin film body 76A being stacked on the base 70A. Note that, each of the thin film bodies may have a circular shape, a triangular shape, a quadrangular shape, or any other polygonal shape in a plan view.

The first thin film body 71A is the environmental component supply unit 3 made of the environmental component-containing material being thinned. The second thin film body 72A, the third thin film body 73A, and the fifth thin film body 75A are the culture unit 1 made of the microorganism-containing culture medium being thinned. The fourth thin film body 74A and the sixth thin film body 76A are the nutrient supply unit 2 made of the nutrient-containing material being thinned. Therefore, the apparatus 100D includes two sets of three-layer stacked structures 10E and 10F, that is, includes the three-layer stacked structure 10E composed of the first thin film body 71A to the fourth thin film body 74A and the three-layer stacked structure 10F composed of the fourth thin film body 74A to the sixth thin film body 76A. Note that, the membrane filter 40 is arranged between the layers.

Figure 39:
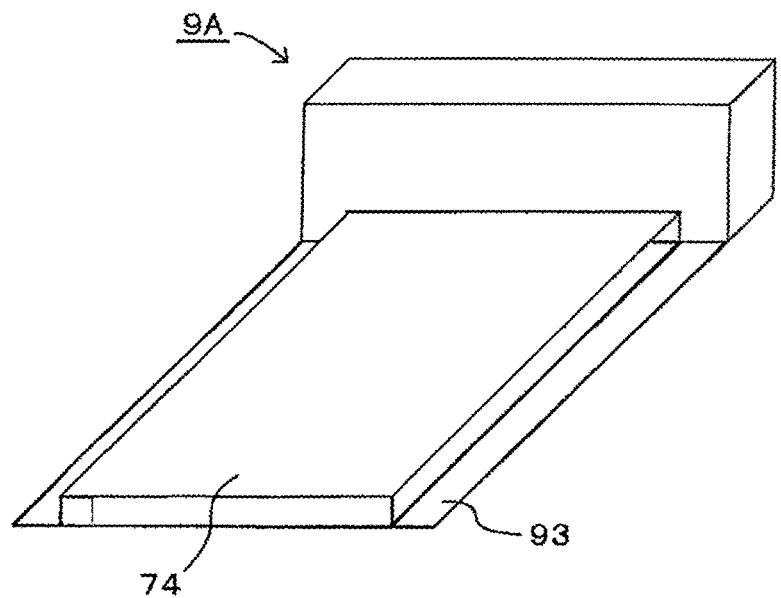
FIG. 39 is a perspective view illustrating an apparatus used for manufacturing a microorganism culture apparatus according to a fourth embodiment of the present invention.

The microorganism culture apparatus 100D is produced using an apparatus illustrated in FIG. 39. This apparatus 9A is for carrying out the doctor blade method. The thinning by the doctor blade method can be performed, for example, as follows. For example, in a case where the fourth thin film body 74A is formed, the nutrient-containing material is formed into a slurry, placed on a carrier film 93, formed into a thin film having a predetermined thickness by a blade, and dried. Each thin film body is formed by such a method. Then, the thin film bodies are stacked with the membrane filter 40 interposed therebetween. Thus, the microorganism culture apparatus 100D can be produced.

Further, the temperature sensor 41, the pH sensor 42, and the ultrasonic oscillator 43 are provided in each of the second thin film body 72A, the third thin film body 73A, and the fifth thin film body 75A which is the culture unit 1. The temperature sensor 41 and the pH sensor 42 are arranged so as to detect the temperature and the pH of the microorganism-containing culture medium of each thin film body, and are connected to an external device (not illustrated). The external device can monitor the temperature and the pH of the microorganism-containing culture medium via both the sensors 41 and 42. The ultrasonic oscillator 43 is arranged so as to apply vibration to the microorganism-containing culture medium of each thin film body. The operation of the ultrasonic oscillator 43 is controlled by the external device.

The microorganism culture apparatus 100D as such can exhibit the same effects as those of the printed layer type apparatus of the third embodiment.

Next, specific examples of the present invention will be described.

EXAMPLES

Example #1

The microorganism culture apparatus 100A (FIG. 9) of the first embodiment was used in this experiment.

Nutrient supply unit:
R2A medium (manufactured by Nihon Pharmaceutical Co., Ltd.) 3.2 g/L Culture unit:
R2A medium (manufactured by Nihon Pharmaceutical Co., Ltd.) 3.2 g/L
Powdered Agar (manufactured by Nacalai Tesque Inc.) 15 g/L The above-mentioned agar aqueous solution was autoclaved (121° C./20 minutes), a soil extract dilution was added thereto when the temperature reached around 60° C., and after stirring, each through-hole 522 of the culture unit was filled therewith. Note that the soil extract dilution was prepared by adding 15 mL of pure water to 5 g of soil, stirring the mixture, after allowing the mixture to stand for 1 hour, serially diluting a supernatant, performing DAPI staining, counting the number of microorganisms by microscopic observation, and adjusting the concentration so that one microorganism entered in each through-hole 522 of the culture unit.

Environmental substance supply unit:
Powdered Agar (manufactured by Nacalai Tesque, Inc.) 15 g/L.

The above-mentioned 95 mL of agar aqueous solution was autoclaved (121° C./20 minutes), 5 mL of a soil extract was added thereto when the temperature reached around 60° C., stirred, and poured into the second recess 57. Note that the soil extract was prepared by adding 15 mL of pure water to 5 g of soil, stirring the mixture, allowing the mixture to stand for 1 hour, and separating a supernatant into 5 mL fractions. A membrane filter VCWP (0.1 μm manufactured by Merck Millipore Corporation) was arranged between the culture unit and the environmental substance supply unit.

Culture Operation:
R2A medium was continuously allowed to flow in the nutrient supply unit for one week to perform culture.

Analysis Methodology:
After the culture, colonies generated in the culture unit were collected and subjected to gene analysis in TechnoSuruga Laboratory Co., Ltd. A homology analysis was performed on about 600 bases in the V1 to V4 regions of 16SrDNA, a simplified molecular phylogenetic tree was created, and identification of species was performed. The degree of homology indicates the degree of coincidence of base sequences, and when the degree of homology was lower than 98%, it was judged as a new species.

DNA extraction achromopeptidase (manufactured by FUJIFILM Wako Pure Chemical Corporation)
PCR amplification PrimeSTAR HS DNA Polymerase (manufactured by Takara Bio Inc.)
Cycle Sequence BigDye Terminator v3.1 Cycle Sequencing Kit (manufactured by Applied Biosystems)
Base sequence determination ChromasPro 1.7 (manufactured by Technelysium)
Database DB-BA12.0 (manufactured by TechnoSuruga Laboratory Co., Ltd.)
International Nucleotide Sequence Database
Search date: Mar. 15, 2018

Comparative Example #1

Colonies were generated by an agar plate surface smearing method, and the same gene analysis was performed.

Figure 40:
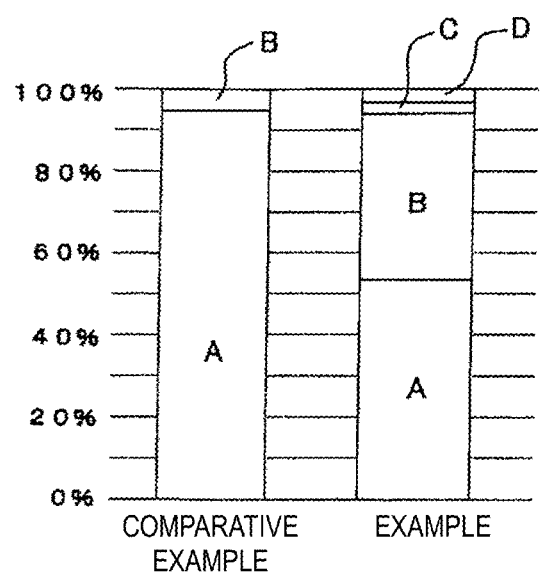
FIG. 40 is a graph illustrating a result of a first example.

FIG. 40 illustrates the results of the gene analysis. In FIG. 40, A represents 100% to 98% of known species, B represents 98% to 94% of new species, C represents 94% to 91% of new genus and new family, and D represents less than 91% of new order. According to this example, about 45% of the obtained microorganisms corresponded to the new species, and new microorganisms at the new order and new genus level were also obtained. Therefore, it was confirmed to be very effective for obtaining difficult-to-culture microorganisms.

Example #2

Figure 41:
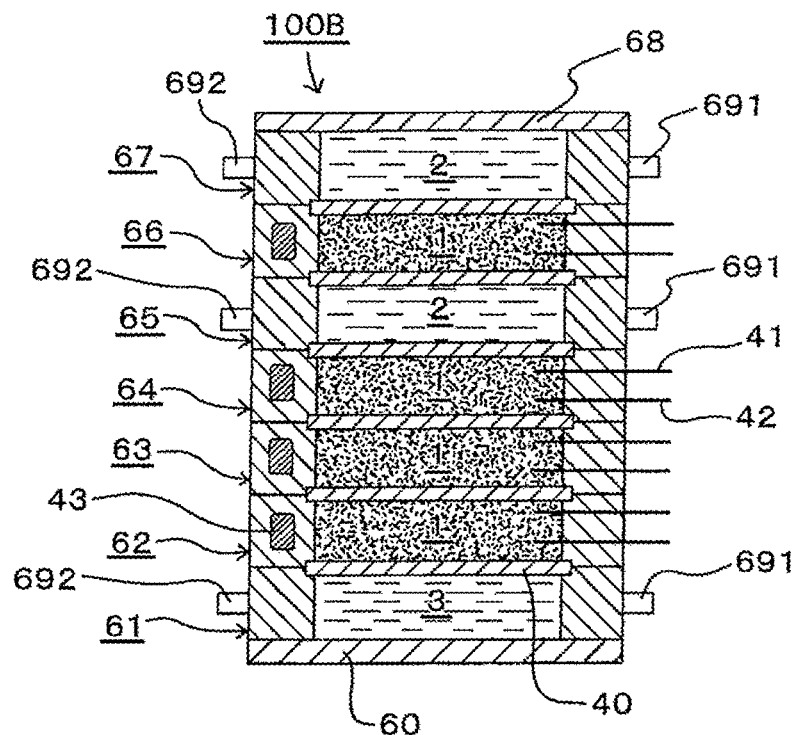
FIG. 41 is a schematic cross-sectional view illustrating a microorganism culture apparatus used in a second example.

The microorganism culture apparatus 100B of the second embodiment was used. However, as illustrated in FIG. 41, the jacket 65 has the same configuration as that of the jacket 67.

Nutrient supply unit (jacket 67)
Substrate A liquid
R2A medium (manufactured by Nihon Pharmaceutical Co., Ltd.) 0.32 g/100 mL
Pure water 100 mL
Nutrient supply unit (jacket 65)
Substrate B liquid
R2A medium (manufactured by Nihon Pharmaceutical Co., Ltd.) 0.032 g/100 mL
Pure water 100 mL
Environmental component supply unit (jacket 61):
Soil extract
Soil extract was prepared at a ratio of 15 g of pure water to 5 g of soil.
Culture unit (jackets 62, 63, 64, 66):
Powdered Agar (manufactured by Nacalai Tesque, Inc.) 1.5 g/100 mL
Pure water 95 mL The above-described agar aqueous solution was autoclaved (121° C./20 minutes), 5 mL of a soil extract dilution was added thereto when the temperature reached around 60° C., and after stirring, an internal space of the jacket serving as the culture unit was filled therewith. Note that, the soil extract dilution was prepared by adding 15 mL of pure water to 5 g of soil, stirring the mixture, allowing the mixture to stand for 1 hour, and diluting a supernatant 10,000-fold by serial dilution.

A membrane filter VCWP (0.1 μm, manufactured by Merck Millipore Corporation) was arranged between the units.

The substrate A liquid, the substrate B liquid, and the soil extract were continuously allowed to flow through the nutrient supply unit (jacket 67), the nutrient supply unit (jacket 65), and the environmental component supply unit (jacket 61) for one week, respectively to be cultured.

Analysis Methodology:
After the culture, the colonies generated in the culture unit were collected and subjected to gene analysis in TechnoSuruga Laboratory Co., Ltd. A homology analysis was performed on about 600 bases in the V1 to V4 regions of 16SrDNA, a simplified molecular phylogenetic tree was created, and identification of species was performed. The degree of homology indicates the degree of coincidence of base sequences, and when the degree of homology was lower than 98%, it was judged as a new species.

DNA extraction achromopeptidase (manufactured by FUJIFILM Wako Pure Chemical Corporation)
PCR amplification PrimeSTAR HS DNA Polymerase (manufactured by Takara Bio Inc.)
Cycle Sequence BigDye Terminator v3.1 Cycle Sequencing Kit (manufactured by Applied Biosystems)
Base sequence determination ChromasPro 1.7 (manufactured by Technelysium)
Database DB-BA12.0 (manufactured by TechnoSuruga Laboratory Co., Ltd.)
International Nucleotide Sequence Database
Search date: Mar. 15, 2018

Comparative Example #2

Colonies were generated by the agar plate surface smearing method, and the same gene analysis was performed.

Figure 42:
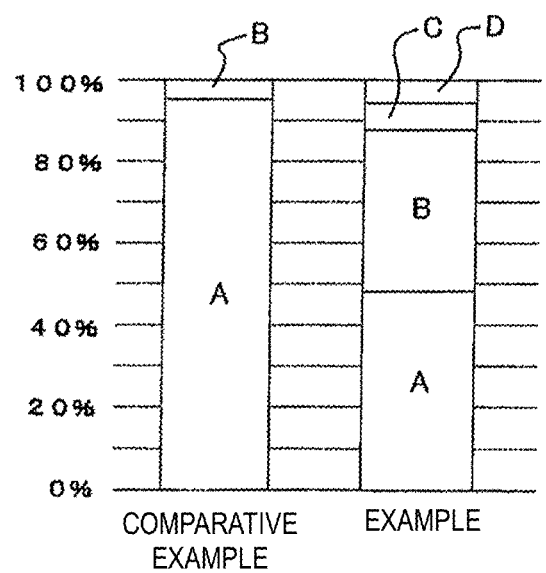
FIG. 42 is a graph illustrating a result of the second example.

FIG. 42 illustrates the results of the gene analysis. In FIG. 42, A represents 100 to 98% of known species, B represents 98 to 94% of new species, C represents 94 to 91% of new genus, and D represents less than 91% of new order. According to this example, about 40% of the obtained microorganisms corresponded to the new species, and new microorganisms at the new order and the new genus level were also obtained. Therefore, it was confirmed to be very effective for obtaining difficult-to-culture microorganisms.

Example #3

The microorganism culture apparatus 100C (FIG. 37) of the third embodiment was used.

Nutrient supply unit (sixth printed layer 76)
Substrate A layer
R2A medium (manufactured by Nihon Pharmaceutical Co., Ltd.) 0.32 g/100 mL
Powdered Agar (manufactured by Nacalai Tesque, Inc.) 1.5 g/100 mL
Pure water 100 mL
Autoclave (121° C./20 minutes) treatment was performed to obtain a substrate paste.
Nutrient supply unit (fourth printed layer 74)
Substrate B layer
R2A medium (manufactured by Nihon Pharmaceutical Co., Ltd.) 0.032 g/100 mL
Powdered Agar (manufactured by Nacalai Tesque, Inc.) 1.5 g/100 mL
Pure water 100 mL
Autoclave (121° C./20 minutes) treatment was performed to obtain a substrate paste.
Environmental component supply unit (first printed layer 71)
Powdered Agar (manufactured by Nacalai Tesque, Inc.) 1.5 g/100 mL
Pure water 95 mL
The above-mentioned agar aqueous solution was autoclaved (121° C./20 minutes), 5 mL of a soil extract was added thereto when the temperature reached around 60° C., and stirred to obtain a soil paste. Note that, the soil extract was prepared by adding 15 mL of pure water to 5 g of soil, stirring the mixture, allowing the mixture to stand for 1 hour, and separating a supernatant into 5 mL fractions.
Culture unit (second, third, and fifth printed layers 72, 73, and 75)
Powdered Agar (manufactured by Nacalai Tesque, Inc.) 1.5 g/100 mL
Pure water 95 mL
The above-described agar aqueous solution was autoclaved (121° C./20 minutes), and when the temperature reached around 60° C., 5 mL of a soil extract dilution was added thereto and stirred to obtain culture pastes. Note that, the soil extract dilution was prepared by adding 15 mL of pure water to 5 g of soil, stirring the mixture, allowing the mixture to stand for 1 hour, and diluting a supernatant 10,000-fold by serial dilution.

Each printed layer was formed using a screw dispenser Quspa Ms (manufactured by Shinwa Co., Ltd.). As a needle, the following multi-needle was used. A needle tip and a syringe were heated to 60° C. with a heater to keep each paste in a molten state. The paste was applied at a gap of 1.2 mm and at a thickness of about 1 mm. It solidified upon standing at room temperature.

21G (ID 0.51 mm)×8 and a pitch of 0.93 mm

A membrane filter VCWP (0.1 µm manufactured by Merck Millipore Corporation) was arranged between the layers.

Culture Operation:

After the multilayer body including the printed layer was formed, the multilayer body was placed in a sterilized petri dish and cultured for one week.

REFERENCE SIGNS LIST 100A to 100C MICROORGANISM CULTURE APPARATUS
10A to 10F THREE-LAYER STACKED STRUCTURE
1 CULTURE UNIT
11 FIRST SURFACE
12 SECOND SURFACE
13 FIRST INTERNAL SPACE
14 FIRST FRAME MAIN BODY
15 FIRST PRINTED LAYER
16 FIRST THIN FILM BODY
2 NUTRIENT SUPPLY UNIT
23 SECOND INTERNAL SPACE
24 SECOND FRAME MAIN BODY
25 SECOND PRINTED LAYER
26 SECOND THIN FILM BODY
27 INFLOW PATH
28 OUTFLOW PATH
3 ENVIRONMENTAL COMPONENT SUPPLY UNIT
33 THIRD INTERNAL SPACE
34 THIRD FRAME MAIN BODY
35 THIRD PRINTED LAYER
36 THIRD THIN FILM BODY
37 INFLOW PATH
38 OUTFLOW PATH
41 TEMPERATURE SENSOR
42 pH SENSOR
43 ULTRASONIC OSCILLATOR (ULTRASONIC VIBRATION UNIT)
51 CASE

The invention claimed is:

1. A microorganism culture apparatus comprising a three-layer vertically stacked structure that includes:
a layered culture unit configured to culture a microorganism; and
at least one of a layered nutrient supply unit that supplies a nutrient to the culture unit, and a layered environmental component supply unit that supplies an environmental component to the culture unit, wherein
a) the layered nutrient supply unit is arranged on a first surface of the culture unit, and the layered environmental component supply unit is arranged on a second surface of the culture unit opposite to the first surface of the culture unit;

b) the microorganism culture apparatus includes two layered nutrient supply units, comprising a first layered nutrient supply unit arranged on a first surface of the culture unit, and a second layered nutrient supply unit arranged on a second surface of the culture unit opposite to the first surface of the culture unit; or c) the microorganism culture apparatus includes two layered environmental component supply units, comprising a first layered environmental component supply unit arranged on a first surface of the culture unit, and a second layered environmental component supply unit arranged on a second surface of the culture unit opposite to the first surface of the culture unit.

2. The microorganism culture apparatus according to claim 1, wherein in the three-layer vertically stacked structure, the first surface of the culture unit comprises a top surface of the layered culture unit, and the second surface comprises a bottom surface of the layered culture unit.

3. The microorganism culture apparatus according to claim 1, wherein in the three-layer vertically stacked structure, the first layered nutrient supply unit is arranged on the first surface of the layered culture unit, and the second layered nutrient supply unit is arranged on the second surface of the layered culture unit.

4. The microorganism culture apparatus according to claim 3, wherein the first layered nutrient supply unit arranged on the first surface of the layered culture unit, and the second layered nutrient supply unit arranged on the second surface of the layered culture unit, are different from each other in at least one of a type and a concentration of a nutrient to be supplied.

5. The microorganism culture apparatus according to claim 1, wherein in the three-layer vertically stacked structure, the first layered environmental component supply unit is arranged on the first surface of the culture unit, and the second layered environmental component supply unit is arranged on the second surface of the layered culture unit.

6. The microorganism culture apparatus according to claim 5, wherein the first layered environmental component supply unit arranged on the first surface of the layered culture unit, and the second layered environmental component supply unit arranged on the second surface of the layered culture unit, are different from each other in at least one of a type and a concentration of an environmental component to be supplied.

7. The microorganism culture apparatus according to claim 1, wherein the layered culture unit holds a microorganism-containing culture medium, the layered nutrient supply unit holds a nutrient-containing material or is configured to allow a nutrient-containing gas or a nutrient-containing liquid to flow through the layered nutrient supply unit, and the layered environmental component supply unit holds an environmental component-containing material or is configured to allow an environmental component-containing gas or an environmental component-containing liquid to flow through the layered environmental component supply unit.

8. The microorganism culture apparatus according to claim 7, wherein the layered culture unit includes a first frame main body surrounding a first internal space, the layered nutrient supply unit includes a second frame main body surrounding a second internal space, the layered environmental component supply unit includes a third frame main body surrounding a third internal space, the first frame main body is capable of holding a microorganism-containing culture medium in the first internal space, the second frame main body is capable of holding a nutrient-containing material in the second internal space or allowing a nutrient-containing gas or a nutrient-containing liquid to flow through the second internal space, the third frame main body is capable of holding an environmental component-containing material in the third internal space or allowing an environmental component-containing gas or an environmental component-containing liquid to flow through the third internal space, and the first frame main body, the second frame main body, and the third frame main body are connectable to each other in a stacked state.

9. The microorganism culture apparatus according to claim 8, wherein the first frame main body, the second frame main body, and the third frame main body are attachable to and detachable from each other.

10. The microorganism culture apparatus according to claim 8, wherein the second frame main body has an inflow path for allowing a fluid to flow into the second internal space and an outflow path for allowing a fluid to flow out of the second internal space, the third frame main body includes an inflow path for allowing a fluid to flow into the third internal space and an outflow path for allowing a fluid to flow out of the third internal space, the inflow path and the outflow path of the second frame main body and the third frame main body are each configured to be openable and closable, the second frame main body is capable of holding a nutrient-containing material in the second internal space in a state in which both the inflow path and the outflow path are closed, and the third frame main body is capable of holding an environmental component-containing material in the third internal space in a state in which both the inflow path and the outflow path are closed.

11. The microorganism culture apparatus according to claim 7, wherein the layered culture unit includes a first printed layer comprising a microorganism-containing culture medium being printed, the layered nutrient supply unit includes a second printed layer comprising a nutrient-containing material being printed, the layered environmental component supply unit includes a third printed layer comprising an environmental component-containing material being printed, and the three-layer vertically stacked structure includes the first printed layer and at least one of the second printed layer and the third printed layer arranged on both surfaces of the first printed layer.

12. The microorganism culture apparatus according to claim 7, wherein the layered culture unit includes a first thin film body comprising a microorganism-containing culture medium being thinned by a doctor blade method, the layered nutrient supply unit includes a second thin film body comprising a nutrient-containing material being thinned by a doctor blade method, the layered environmental component supply unit includes a third thin film body comprising an environmental component-containing material being thinned by a doctor blade method, and the three-layer vertically stacked structure includes the first thin film body and at least one of the second thin film body and the third thin film body arranged on both surfaces of the first thin film body.

13. A method for culturing a microorganism using the microorganism culture apparatus according to claim 7, the method comprising:

culturing one or more microorganisms in the culture medium in the layered culture unit;

a) changing at least one of a type and a concentration of a nutrient-containing gas or a nutrient-containing liquid allowed to flow through the nutrient supply unit, and/or b) changing at least one of a type and a concentration of an environmental component-containing gas or an environmental component-containing liquid allowed to flow through the layered environmental component supply unit.

14. The microorganism culture apparatus according to claim 1, wherein in the three-layer stacked structure, the layered culture unit is provided so as to be exchangeable with another layered culture unit, the layered nutrient supply unit is provided so as to be exchangeable with another layered nutrient supply unit or exchangeable with a layered environmental component supply unit, or the layered environmental component supply unit is provided so as to be exchangeable with another layered environmental component supply unit or exchangeable with a layered nutrient supply unit.

15. A method for culturing a microorganism using the microorganism culture apparatus according to claim 14, the method comprising:

culturing one or more microorganisms in the culture unit; and a) exchanging the nutrient supply unit with another nutrient supply unit or with an environmental component supply unit, and/or b) exchanging the environmental component supply unit with another layered environmental component supply unit or with a layered nutrient supply unit.

16. The microorganism culture apparatus according to claim 1, wherein the layered culture unit includes one or more types of sensors that detect a microorganism culture state.

17. The microorganism culture apparatus according to claim 16, wherein the sensor is selected from a temperature sensor, a pH sensor, and a gas concentration sensor.

18. A method for culturing a microorganism using the microorganism culture apparatus according to claim 16, the method comprising:

culturing one or more microorganisms in the layered culture unit; and detecting and monitoring a microorganism culture state using the one or more types of sensors; and a) changing at least one of a type and a concentration of a nutrient-containing gas or a nutrient-containing liquid allowed to flow through the layered nutrient supply unit, and/or b) changing at least one of a type and a concentration of an environmental component-containing gas or an environmental component-containing liquid allowed to flow through the layered environmental component supply unit, based on the microorganism culture state.

19. A method for culturing a microorganism using the microorganism culture apparatus according to claim 16, the method comprising:

culturing one or more microorganisms in the layered culture unit; and detecting or monitoring a microorganism culture state using the one or more types of sensors; and a) exchanging the layered nutrient supply unit with another layered nutrient supply unit or with a layered environmental component supply unit, and/or b) exchanging the layered environmental component supply unit with another layered environmental component supply unit or with a layered nutrient supply unit, based on the microorganism culture state.

20. The microorganism culture apparatus according to claim 1, wherein one or more types of stimulation applying units that apply physical stimulation to the layered culture unit from outside are attached to the culture unit.

21. The microorganism culture apparatus according to claim 20, wherein the stimulation applying unit is selected from a light irradiation unit, a heating unit, an electromagnetic wave irradiation unit, and an ultrasonic vibration unit.

22. The microorganism culture apparatus according to claim 1, wherein the three-layer vertically stacked structure is positioned in one case.

* * * * *